(12) United States Patent
Ingrassia, Jr. et al.

(10) Patent No.: US 8,773,470 B2
(45) Date of Patent: Jul. 8, 2014

(54) SYSTEMS AND METHODS FOR DISPLAYING VISUAL INFORMATION ON A DEVICE

(75) Inventors: Michael Ignazio Ingrassia, Jr., San Jose, CA (US); Benjamin Andrew Rottler, San Francisco, CA (US)

(73) Assignee: Apple Inc., Cupertino, CA (US)

(*) Notice: Subject to any disclaimer, the term of this patent is extended or adjusted under 35 U.S.C. 154(b) by 1066 days.

(21) Appl. No.: 12/776,231

(22) Filed: May 7, 2010

(65) Prior Publication Data

US 2011/0273479 A1    Nov. 10, 2011

(51) Int. Cl.
*G09G 5/00* (2006.01)
*G09G 5/08* (2006.01)
*G06F 3/041* (2006.01)
*G06F 3/14* (2006.01)
*G06F 3/033* (2013.01)
*G06F 3/048* (2013.01)

(52) U.S. Cl.
USPC .......... 345/666; 345/157; 345/158; 345/173; 345/660; 715/764; 715/863; 715/864

(58) Field of Classification Search
None
See application file for complete search history.

(56) References Cited

U.S. PATENT DOCUMENTS

| | | | |
|---|---|---|---|
| 7,348,998 B2 | 3/2008 | Belz | |
| 7,403,951 B2 | 7/2008 | Setlur et al. | |
| 2007/0022367 A1 | 1/2007 | Ingrassia et al. | |
| 2007/0083808 A1 | 4/2007 | Setlur et al. | |
| 2007/0097089 A1* | 5/2007 | Battles | 345/173 |
| 2007/0157283 A1 | 7/2007 | Setlur et al. | |
| 2007/0186005 A1 | 8/2007 | Setlur et al. | |
| 2008/0052945 A1 | 3/2008 | Matas et al. | |
| 2008/0062141 A1* | 3/2008 | Chandhri | 345/173 |
| 2009/0058822 A1* | 3/2009 | Chaudhri | 345/173 |
| 2009/0213086 A1* | 8/2009 | Chae et al. | 345/173 |
| 2009/0215497 A1 | 8/2009 | Louch | |
| 2009/0313293 A1 | 12/2009 | Setlur et al. | |
| 2009/0322695 A1* | 12/2009 | Cho et al. | 345/173 |
| 2010/0020221 A1 | 1/2010 | Tupman et al. | |
| 2010/0020222 A1 | 1/2010 | Jones et al. | |
| 2010/0082328 A1 | 4/2010 | Rogers et al. | |
| 2010/0082346 A1 | 4/2010 | Rogers et al. | |
| 2010/0082347 A1 | 4/2010 | Rogers et al. | |
| 2010/0083111 A1* | 4/2010 | de los Reyes | 715/702 |
| 2010/0173678 A1* | 7/2010 | Kim et al. | 455/566 |
| 2010/0177049 A1* | 7/2010 | Levy et al. | 345/173 |
| 2010/0192100 A1* | 7/2010 | Wu et al. | 715/834 |
| 2011/0055753 A1* | 3/2011 | Horodezky et al. | 715/810 |

* cited by examiner

*Primary Examiner* — Tize Ma
(74) *Attorney, Agent, or Firm* — Morrison & Foerster LLP

(57) ABSTRACT

Systems, methods, and devices for displaying visual information on an electronic display are provided. For example, rather than requiring a user to manually pan and zoom across visual information displayed on an electronic display, an electronic device may automatically display certain details of the visual information that are of interest to the user. One such method may include defining objects in visual information and detecting certain specific touch input gestures entered on the electronic display while the electronic display is displaying the visual information. When the touch input gestures are detected, the electronic device may automatically display a sequence of the objects of the visual information on the electronic display.

29 Claims, 20 Drawing Sheets

# SYSTEMS AND METHODS FOR DISPLAYING VISUAL INFORMATION ON A DEVICE

BACKGROUND

The present disclosure relates generally to displaying visual information on an electronic display and, more particularly, to displaying certain elements of visual information in greater detail on an electronic display.

This section is intended to introduce the reader to various aspects of art that may be related to various aspects of the present disclosure, which are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

Electronic devices commonly display visual information of many types. For example, certain devices may display images and photos, maps, videos, documents, and so forth. Occasionally, a user of such an electronic device may desire to view certain elements of the visual information in greater detail. Accordingly, techniques have been developed to zoom in and out, as well as pan in various directions, to enable a user to more closely view such visual information. For example, certain touch screen display devices may have capabilities that enable a user to perform a "pinch" touch input gesture to zoom in on details of the visual information.

While such techniques may be effective when the electric device has a sufficiently large display screen or when the visual information on the display screen lacks detail, smaller display screens or visual information with greater detail may be difficult to view using such techniques. In particular, as electronic devices become smaller, many conventional techniques for viewing visual information on a correspondingly small display may be unwieldy or uncomfortable. Indeed, for small displays, many conventional touch input gestures may result in the user's fingers covering a substantial part of the display while zooming and panning, blocking the user's view of the visual information.

SUMMARY

A summary of certain embodiments disclosed herein is set forth below. It should be understood that these aspects are presented merely to provide the reader with a brief summary of these certain embodiments and that these aspects are not intended to limit the scope of this disclosure. Indeed, this disclosure may encompass a variety of aspects that may not be set forth below.

Embodiments of the present disclosure relate to systems, methods, and devices for displaying visual information on an electronic display. For example, an electronic device may automatically display certain details of the visual information that are of interest to the user. One such method may include defining objects in visual information and detecting certain specific touch input gestures entered on the electronic display while the electronic display is displaying the visual information. When the touch input gestures are detected, the electronic device may automatically display a sequence of the objects of the visual information on the electronic display.

BRIEF DESCRIPTION OF THE DRAWINGS

Various aspects of this disclosure may be better understood upon reading the following detailed description and upon reference to the drawings in which.

DETAILED DESCRIPTION OF SPECIFIC EMBODIMENTS

Figure 1:
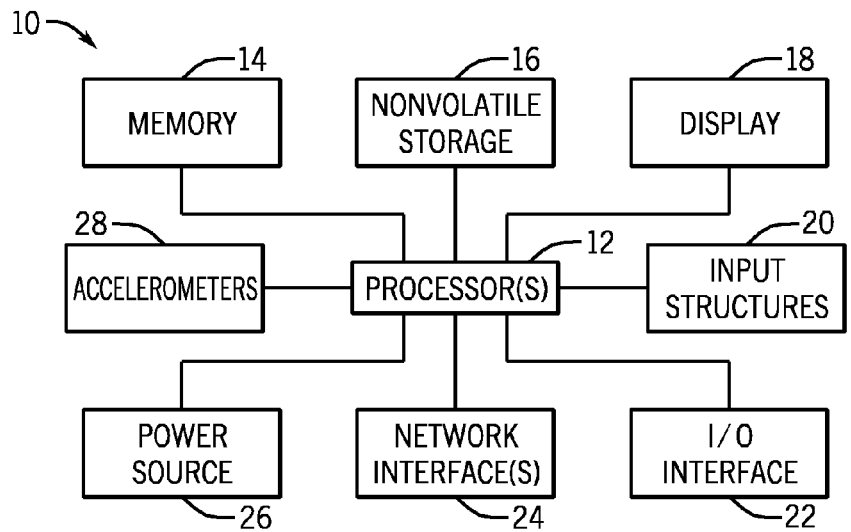
FIG. 1 is a block diagram representing a system configured to perform the techniques disclosed herein, in accordance with an embodiment.
Figure 3:
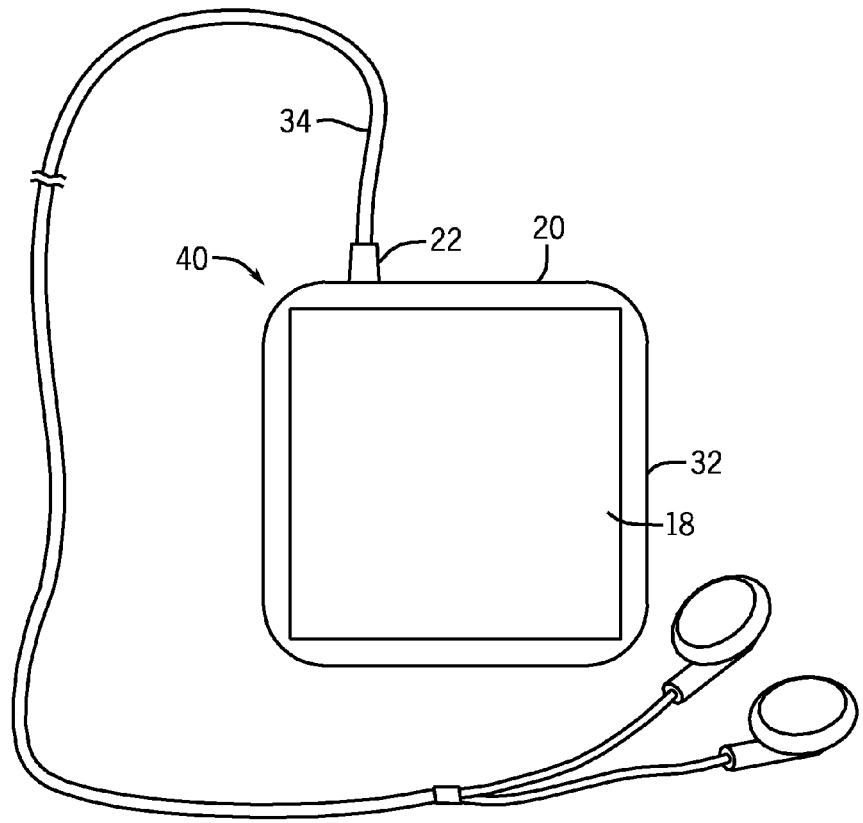
FIG. 3 is a schematic view of the system of FIG. 1 in the form of a compact media device, in accordance with an embodiment.

One or more specific embodiments will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

Present embodiments relate to techniques for viewing visual information on an electronic display. Because electronic devices may display highly detailed images, maps, videos, and so forth via electronic displays that may be too small to fully illustrate all elements of the visual information at once, the present disclosure describes a variety of ways to display certain elements of detail within the visual information. To provide one example, many digital photos now include enough detail to sufficiently produce very large prints (e.g., 16"×20"), while electronic device display screens may be much smaller (e.g., 3.5" diagonally or even less than approximately 2 square inches). In other words, certain digital images may have much higher resolutions (e.g., 2000 px×2000 px) than certain device display screens (e.g., 200 px×200 px). When such digital images are displayed in a comprehensive (e.g., fully zoomed-out) view on such device display screens, some of the details may be too small to see without zooming to a greater level of detail.

Visual information displayed on the electronic display may include a variety of identifiable details, referred to herein as "objects," which may include faces, edge-defined items, words, and so forth. These objects may be identified automatically or manually. For example, an electronic device may automatically identify certain faces in photos as belonging to particular people, or may determine that a particular item or words are present based on similar identification. In some embodiments, a user, such as the user of the electronic device, may manually identify certain objects. For example, many popular applications for image management may allow various users to "tag" an image to identify all or part of the image before the image is stored on the electronic device or while the image is being displayed on the electronic device.

Since the details of the visual information that appear on the electronic display may be represented by the various identifiable objects, the electronic device may enable the user to view such details with relative ease by displaying the objects in greater detail. When a user performs a specific touch input gesture, the electronic device may begin to cycle through various of the objects on the display screen of the electronic device, panning to and zooming in on the objects in greater detail. To this end, the specific embodiments provided below are intended to be examples and should not be understood as exhaustive. For example, while the embodiments described below may involve displaying the objects in of the visual information in greater detail in a specific sequence based on the user touch gesture, the objects may be displayed in alternative embodiments in any suitable order.

Rather than simply enabling manual zooming and panning to view details of such visual information, the electronic device may display certain of the objects present in the visual information in greater detail automatically. In one example, a user may perform a "swipe then hold" touch input gesture, leaving a finger on the display screen of the electronic device. The electronic device then may pan and zoom onto any objects along a direction vector of the user's swipe gesture or, more generally, along a directional path associated with the user's swipe gesture. The user may vary the speed and/or direction of such cycling by moving the finger to the left or to the right and/or by tilting the orientation of the display screen.

In another embodiment, which may be particularly suitable for a very small display screen (e.g. a display screen of approximately less than 3 square inches), a user may initiate the detailed display of certain objects with a "hold then swipe" touch input gesture. Such a gesture may end when the user lifts a finger off of the electronic display, permitting full view of the electronic display. Thereafter, the electronic device may cycle through the objects found along a directional path defined by the swipe.

In either of the above-mentioned embodiments, a user may select an object currently being displayed on the electronic display with another touch input gesture, such as a "single tap" touch input gesture, and/or may return to view an overall display of the visual information with yet another touch input gesture, such as a "double tap" touch input gesture. In a further embodiment, when an object has been selected in such a manner, the user may perform a certain touch input gesture (e.g., "swipe then hold" or "hold then swipe") to view similar images that contain the same object. For example, when a user selects a particular person's face in an image and performs the touch input gesture, the electronic device may begin to automatically cycle through other images that also contain the face of the identified person.

With the foregoing in mind, FIG. 1 represents a block diagram of an electronic device 10 configured to perform such techniques for displaying visual information. Among other things, the electronic device 10 may include processor(s) 12, memory 14, nonvolatile storage 16, the display 18, input structures 20, an input/output (I/O) interface 22, network interface(s) 24, a power source 26, and/or accelerometers 28. The various functional blocks shown in FIG. 1 may include hardware elements (including circuitry), software elements (including computer code stored on a computer-readable medium) or a combination of both hardware and software elements. It should be noted that FIG. 1 is merely one example of a particular implementation and is intended to illustrate the types of components that may be present in the electronic device 10.

In general, the processor(s) 12 may govern the operation of the electronic device 10. In some embodiments, based on instructions loaded into the memory 14 from the nonvolatile storage 16, the processor(s) 12 and/or other data processing circuitry may respond to user touch gestures input via the display 18. It should be noted that the data processing circuitry may be embodied wholly or in part as software, firmware, hardware, or any combination thereof. Furthermore, the data processing circuitry may be a single contained processing module or may be incorporated wholly or partially within any of the other elements within electronic device 10.

In the electronic device 10 of FIG. 1, the processor(s) 12 may be operably coupled with the memory 14 and the nonvolatile storage 16 to provide various algorithms for carrying out the presently disclosed techniques. Such programs or instructions executed by the processor(s) 12 may be stored in any suitable article of manufacture that includes one or more tangible, computer-readable media at least collectively storing the instructions or routines, such as the memory 14 and the nonvolatile storage 16. Also, programs (e.g., an operating system) encoded on such a computer program product may also include instructions that may be executed by the processor(s) 12 to enable the electronic device 10 to provide various functionalities, including those described herein.

The display 18 may be a flat panel display, such as a liquid crystal display (LCD). As discussed in greater detail below, although the display 18 may have a lower resolution than certain visual information that is to be displayed, and although the display 18 may be relatively small (e.g., 3.5" diagonally or approximately 2 square inches), the display 18 may be capable of displaying certain detailed elements of the visual information ("objects") in greater detail automatically. According to the techniques disclosed herein, despite the size of the display, a user may view many such detailed elements of the visual information with minimal effort and without view-impeding touch input gestures. Additionally, the display 18 may represent one of the input structures 20. Specifically, the display 18 may serve as a capacitive-touch-sensitive display capable of detecting projected capacitive touch (PCT) touch input gestures. By way of example, the display 18 may have a Multi-Touch™ interface, and may be capable of detecting such touch input gestures as a "swipe," "hold," and/or certain touch input gestures involving more than one simultaneous touch.

Other input structures 20 may include, for example, keys, buttons, and/or switches. The I/O ports 22 of the electronic device 10 may enable the electronic device 10 to transmit data to and receive data from other electronic devices 10 and/or various peripheral devices, such as external keyboards or mice. The network interface(s) 24 may enable personal area network (PAN) integration (e.g., Bluetooth), local area network (LAN) integration (e.g., Wi-Fi), and/or wide area network (WAN) integration (e.g., 3G). The power source 26 of the electronic device 10 may be any suitable source of power, such as a rechargeable lithium polymer (Li-poly) battery and/or alternating current (AC) power converter. Accelerometers 28 may detect an orientation of the electronic device 10. Changes in orientation may be employed to vary the speed at which the detailed elements of the visual information are displayed on the display 18.

Figure 2:
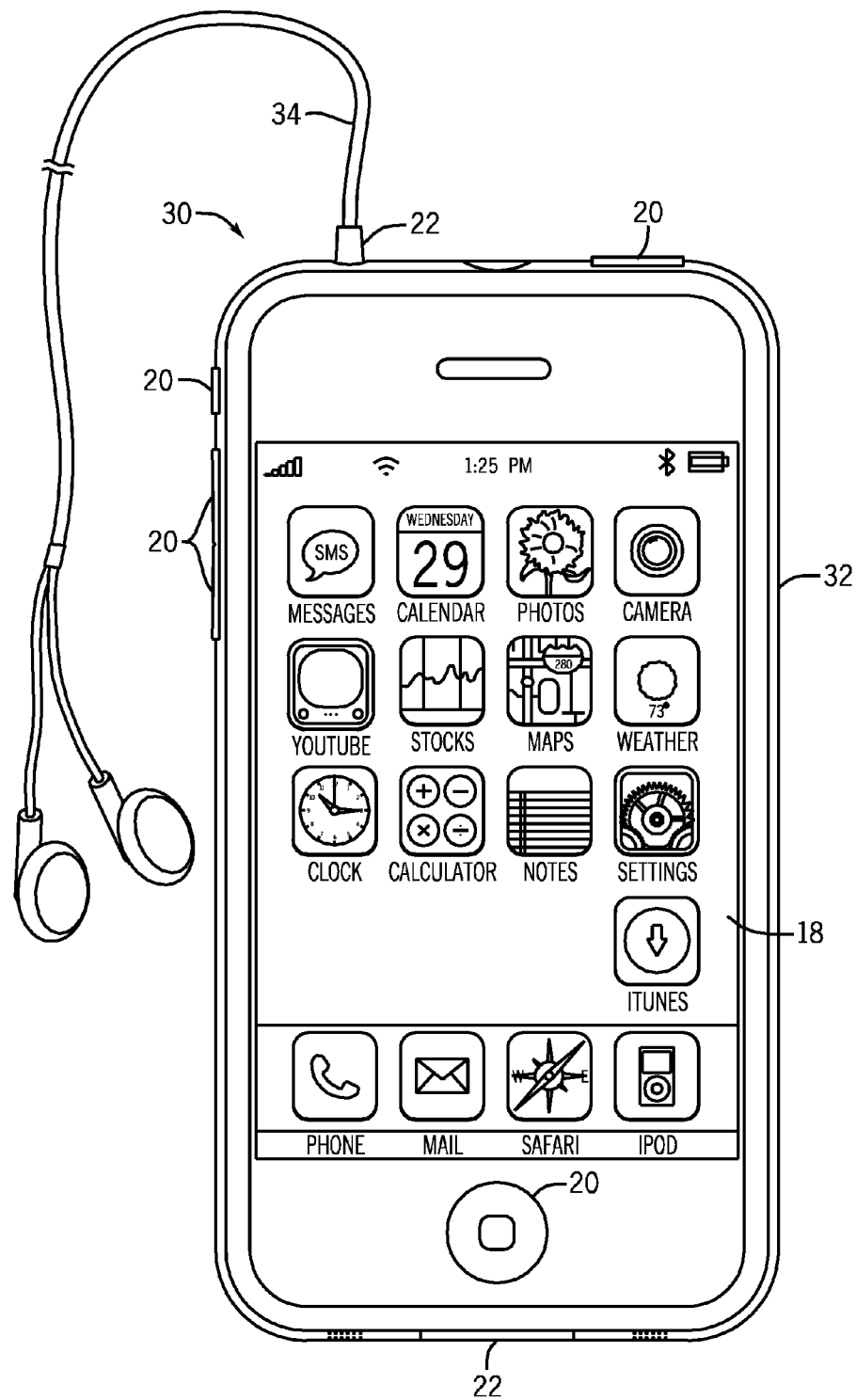
FIG. 2 is a schematic view of the system of FIG. 1 in the form of a handheld device, in accordance with an embodiment.

FIG. 2 illustrates an electronic device 10 in the form of a handheld device 30. The handheld device 30 may incorporate the functionality of one or more types of devices, such as a media player, a cellular phone, a gaming platform, a personal data organizer, and so forth. By way of example, the handheld device 30 may be a model of an iPod® or iPhone® available from Apple Inc. of Cupertino, Calif.

The handheld device 30 may include an enclosure 32 or body that protects the interior components from physical damage and shields them from electromagnetic interference. The enclosure 32 may be formed from any suitable material, such as plastic, metal or a composite material, and may allow certain frequencies of electromagnetic radiation to pass through to wireless communication circuitry within handheld device 30 to facilitate wireless communication. The enclosure 32 may also include user input structures 20 through which a user may interface with the device. Each user input structure 20 may be configured to help control a device function when actuated. For example, in a cellular telephone implementation, one or more input structures 20 may be configured to invoke a "home" screen or menu to be displayed, to toggle between a sleep and a wake mode, to silence a ringer for a cell phone application, to increase or decrease a volume output, and so forth.

The display 18 may be of a relatively medium size (e.g., approximately 3.5" diagonally). The display 18 may display a graphical user interface (GUI) that allows a user to interact with the handheld device 30. To this end, the display 18 may be a capacitive touch screen capable of detecting various touch input gestures (e.g., a Multi-Touch™ interface), including multiple simultaneous touch input gestures. Icons of the GUI may be selected via a touch screen included in the display 18, or may be selected by one or more input structures 20, such as a wheel or button. The handheld device 30 also may include various I/O ports 22 that allow connection of the handheld device 30 to external devices. For example, one I/O port 22 may be a port that allows the transmission and reception of data or commands between the handheld device 30 and another electronic device, such as a computer. Such an I/O port 22 may be a proprietary port from Apple Inc. or may be an open standard I/O port. Another I/O port 22 may include a headphone jack to allow a headset 34 to connect to the handheld device 30.

The electronic device 10 of FIG. 1 also may take the form of a compact media player 40. By way of example, the compact media player 40 may be an iPod® by Apple Inc. The compact media player 40 may include a display 18 of a relatively small size (e.g., less than approximately 2 square inches). Like the display 18 of the handheld device 30, the display 18 of the compact media player 40 may be a capacitive touch screen capable of detecting touch input gestures, including multiple simultaneous touch input gestures. The compact media player 40 may further include one or more input structures 20, such as an on-off button or a lock button. An I/O interface 22 of the compact media player 40 may enable a headset 34 to connect to the compact media player 40. Additionally, the I/O interface 22 may enable the compact media player 40 to intercommunicate with another electronic device, such as a desktop or laptop computer.

The electronic device 10, whether in the form of the handheld device 30 or the compact media player 40, may display certain visual information for the user to view on the display 18. The visual information may include, among other things, images such as photos, maps, documents, and/or videos, and so forth. In general, the resolution and/or size of the display 18 relative to the total amount of visual information available to view may prevent all details from being viewed in great detail when a comprehensive (e.g., fully zoomed-out) view of the visual information is presented on the display 18.

Figure 4:
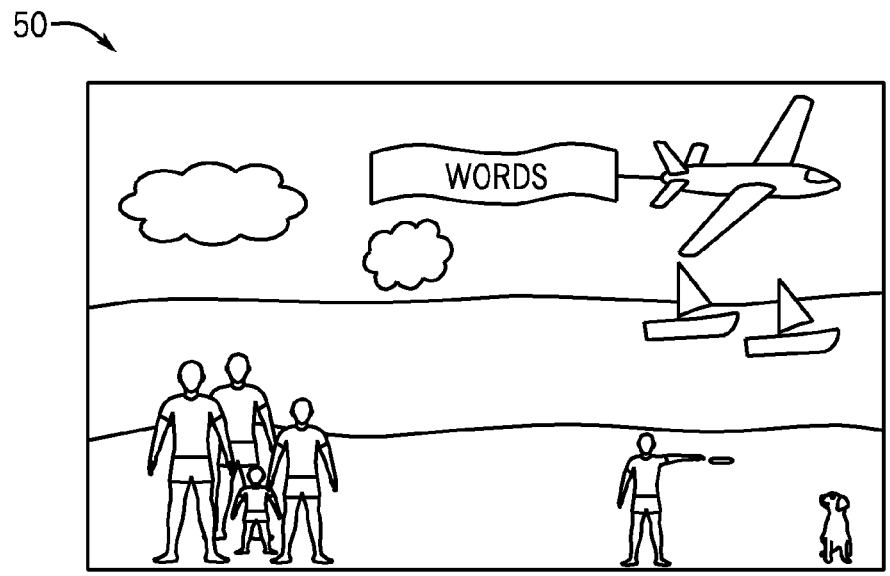
FIG. 4 is a representation of visual information that may be displayed on the devices of FIG. 2 or FIG. 3, in accordance with an embodiment.
Figure 5:
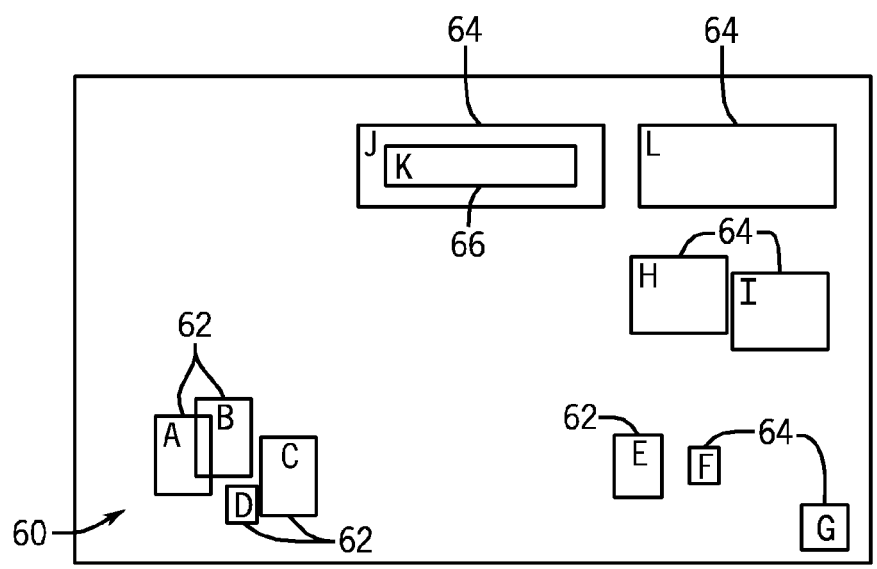
FIG. 5 is a representation of the location of objects that may appear in the visual information of FIG. 4, in accordance with an embodiment.

Indeed, many details may be present in visual information on the display 18 that a user may desire to view more closely, as illustrated by a digital photo 50 of FIG. 4. The digital photo 50 may be displayed on the display 18 as part of a digital photo viewer application. Certain data (e.g., metadata) associated with the digital photo 50 may include a variety of objects 60, as shown in FIG. 5, which represent certain identified or identifiable details of the photo 50. Although several of the following examples relate to the digital photo 50, it should be appreciated that the embodiments disclosed below may be employed for use with any suitable visual information displayable on the display 18, such as images and drawings, maps, videos, documents, and so forth.

In general, the objects 60 may be identified from the digital photo 50 automatically by the electronic device 10 or another electronic device (e.g., a computer), or manually by a user. For example, faces of people in the digital photo 50 may have been previously identified as face objects 62 by an application program running on a computer, such as iPhoto® by Apple Inc. In some embodiments, certain objects 60, such as the face objects 62, may be identified on-the-fly by the electronic device 10 when the digital photo 50 is being viewed. Additionally or alternatively, the user may manually identify the objects 60 while viewing the digital photo 50 on the electronic device 10 or while viewing the photo in an application program running on a computer (e.g., iPhoto®). Further, in certain embodiments, the objects 60 may have been previously identified (e.g., "tagged") by other users via online photo display websites (e.g., Flickr®).

Each of the identified objects 60 may have a size as illustrated by the boxes shown in FIG. 5. For purposes of clarity, each of the objects 60 have been respectively labeled A-L. In an actual implementation, each of the objects 60 may be associated with various identifying data, such as a type, a name, an indication of how the object 60 was identified, and so forth.

As mentioned above, the face objects 62 may be among the identified or identifiable objects 60. As illustrated in FIG. 5, the face objects 62 are labeled A-E and correspond to people identifiable from the digital photo 50 of FIG. 4. The size of the face objects 62 may include substantially only the identifiable person's face or may extend to encompass the person's body or part of the person's body. A number of non-face items 64, as shown in FIG. 5, are the objects 60 labeled F-J and L. Such items 64 correspond, for example, to a flying disc, a dog, two sail boats, a banner, and an airplane in the digital photo 50 of FIG. 4. The items 64 may be identified automatically by the electronic device 10 or another electronic device through edge detection, or may be identified manually by a user. Other types of objects 60 may be identifiable from the photo 50 of FIG. 4. For example, the object 60 labeled K may represent certain words 66 that have been identified automatically by the electronic device 10 or another electronic device, or that have been identified manually by a user.

Figure 6:
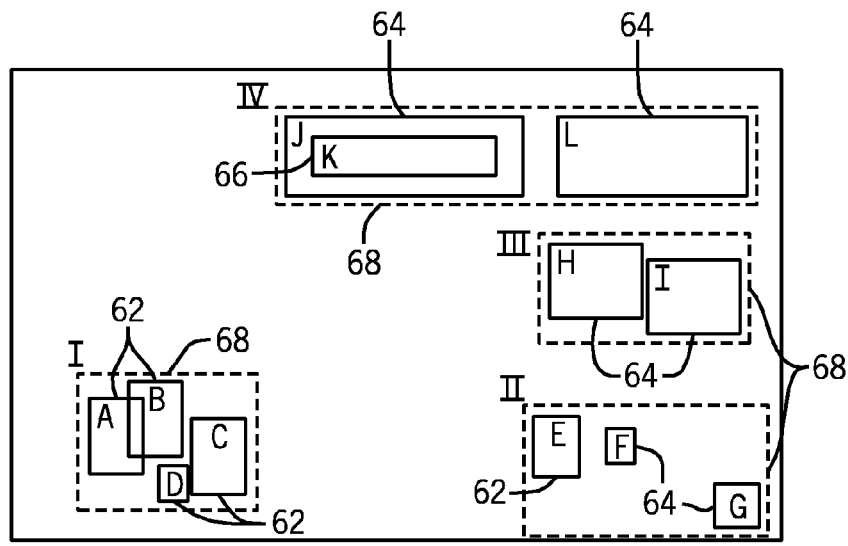
FIG. 6 is a representation of clusters of objects that may appear in the visual information of FIG. 4, in accordance with an embodiment.

FIG. 6 illustrates the objects 60 of FIG. 5 with reference to clusters 68 of the objects 60. Specifically, certain of the objects 60 may relate to one another as a group. Thus, in some embodiments, the data (e.g., metadata) associated with the digital photo 50 may predefine the clusters 68 of the objects 60 or the electronic device 10 may automatically detect such clusters 68 based on the existence of several related objects 60. In some embodiments, the clusters 68 may be pre-identified or identified on-the-fly by the electronic device 10 when the digital photo 50 is displayed on the display 18. In other embodiments, the clusters 68 may be identified manually by a user. Like the objects 60, the clusters 68 may be associated with various identifying data, such as a type, a name, an indication of how the cluster 68 was identified, and so forth.

The clusters 68 may be identified automatically in a variety of ways. For example, in some embodiments, the clusters 68 may represent objects 60 of a similar type (e.g., all face objects 62) or that are located within a certain distance from each other. Additionally or alternatively, the clusters 68 may represent groups of objects 60 that overlap one another, or that are fully contained within one another. In the example of FIG. 6, a first cluster 68 labeled I may include a series of face objects 62 labeled A-D, which may correspond to a family depicted in the digital photo 50 of FIG. 4. The cluster 68 labeled I may have been identified automatically by the electronic device 10 or by another electronic device because the face objects 62 labeled A-D are of a similar type, are located within a certain distance of each other, and/or are separated from other objects 60. Similarly, a second cluster 68 labeled II may include a series of objects 60 labeled E-G, corresponding to a person throwing a disc to a dog in the digital photo 50. By way of example, the cluster 68 labeled II may have been identified automatically by the electronic device 10 or by another electronic device because the objects 60 labeled E-G are within a certain horizontal distance of one another. A third cluster 68 labeled III may include two similar items 64 labeled H and I having similar characteristics (e.g., same shape and/or similar profiles), appearing as two sailboats in the digital photo 50. In one example, the third cluster 68 labeled iii may have been identified automatically by the electronic device 10 or another electronic device because the two items 64 share similar characteristics and are located within a certain distance from one another. A fourth cluster 68 labeled iv may include a series of objects 60 labeled J-L and corresponding to an airplane carrying an aerial banner advertisement. It should be appreciated that, in some embodiments, certain of the clusters 68 of objects 60 may be found within other objects 60 or within other clusters 68. Also, in some embodiments, there may be clusters 68 of cluster 68 of objects 60.

A user may desire to view the various objects 60 in greater detail, without employing an intrusive touch input gesture that may block the user's view of the screen on the display 18 on the electronic device 10. Thus, the electronic device 10 may be configured to perform an algorithm for viewing such visual information details by illustrating each of the objects 60 in greater detail. As illustrated by a flowchart 80 of FIG. 7, the electronic device 10 may automatically display the various objects 60 from among the visual information displayed on the screen in a non-intrusive manner. The flowchart 80 of FIG. 7 may be particularly useful for an electronic device 10 having a display 18 large enough to display images that may remain in view despite the presence of one finger remaining on the display 18.

The flowchart 80 may begin when certain visual information is displayed on the display 18 of the electronic device 10 (block 82). The data that provides the visual information to the display 18 may have a greater amount of detail than may be currently displayed on the display 18. By way of example, the visual information may include an image such as a photo, a map, a video, or a document, among other things.

The user may next undertake a particular touch input gesture (block 84). By way of example, the gesture may be a "swipe then hold" touch input gesture that involves swiping a finger across the display 18 before holding the finger in place. As mentioned above, such a touch input gesture may be employed when the display 18 is large enough to provide a somewhat unfettered view of the visual information despite the presence of the user's finger on the display 18. Having detected the "swipe then hold" gesture, the electronic device 10 may next determine a direction vector or, more generally, a directional path of the swipe and/or a speed of the swipe (block 86). The direction vector and/or the directional path and the speed of the swipe may control certain aspects of the automatic display of the objects 60 of the visual information displayed on the display 18.

Thereafter, the electronic device 10 may cause various objects 60 of the visual information displayed on the display 18 to be viewed in greater detail (block 88). As discussed in greater detail below, in certain embodiments, the electronic device 10 may pan and zoom to certain clusters 68 of objects 60 before panning and zooming to the constituent objects 60 of the cluster 68. Additionally, the electronic device 10 may pan and zoom to certain objects 60 and/or clusters 68 that are intersected by the direction vector and/or directional path determined in block 86. Further, in some embodiments, the initial speed at which such panning and zooming occurs may depend upon the speed determined in block 86.

When the touch input gesture of step 84 results in the user maintaining a finger in place on the display 18, the movement of the user's finger to the left or to the right (or alternatively, up or down, or any suitable direction) may cause the electronic device 10 to vary the speed at which the objects 60 are displayed in greater detail on the display 18 (block 90).

After the user has viewed the various objects 60 in detail, the user may desire to perform other tasks on the electronic device 10. Thus, the electronic device 10 may refrain from cycling through the display of the objects 60 when the electronic device 10 detects another touch input gesture (block 92). If the touch input gesture represents a gesture other than a "single tap" touch input gesture, for example (decision block 94), the electronic device 10 may return to a comprehensive (e.g., zoomed-out) view of the visual information displayed on the screen at the time the flowchart 80 began (block 82). If the touch input gesture represents a "single tap" touch input gesture, the electronic device 10 may pause and display only the currently selected objects 60 (block 96).

Figure 8:
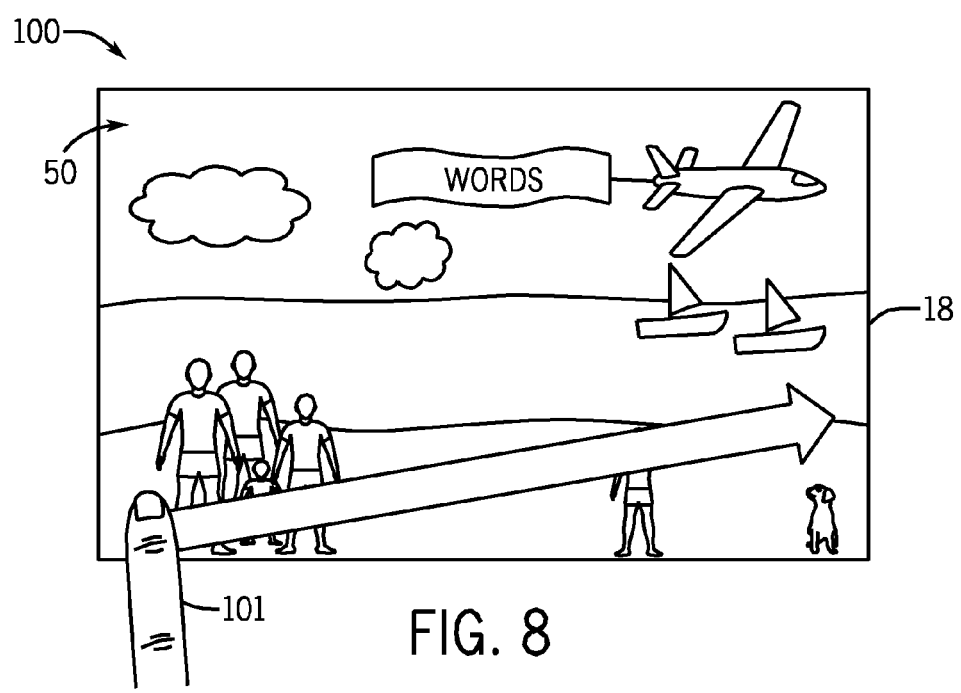
FIG. 8 is a representation of a touch input gesture for initiating the technique of FIG. 7, in accordance with an embodiment.
Figure 7:
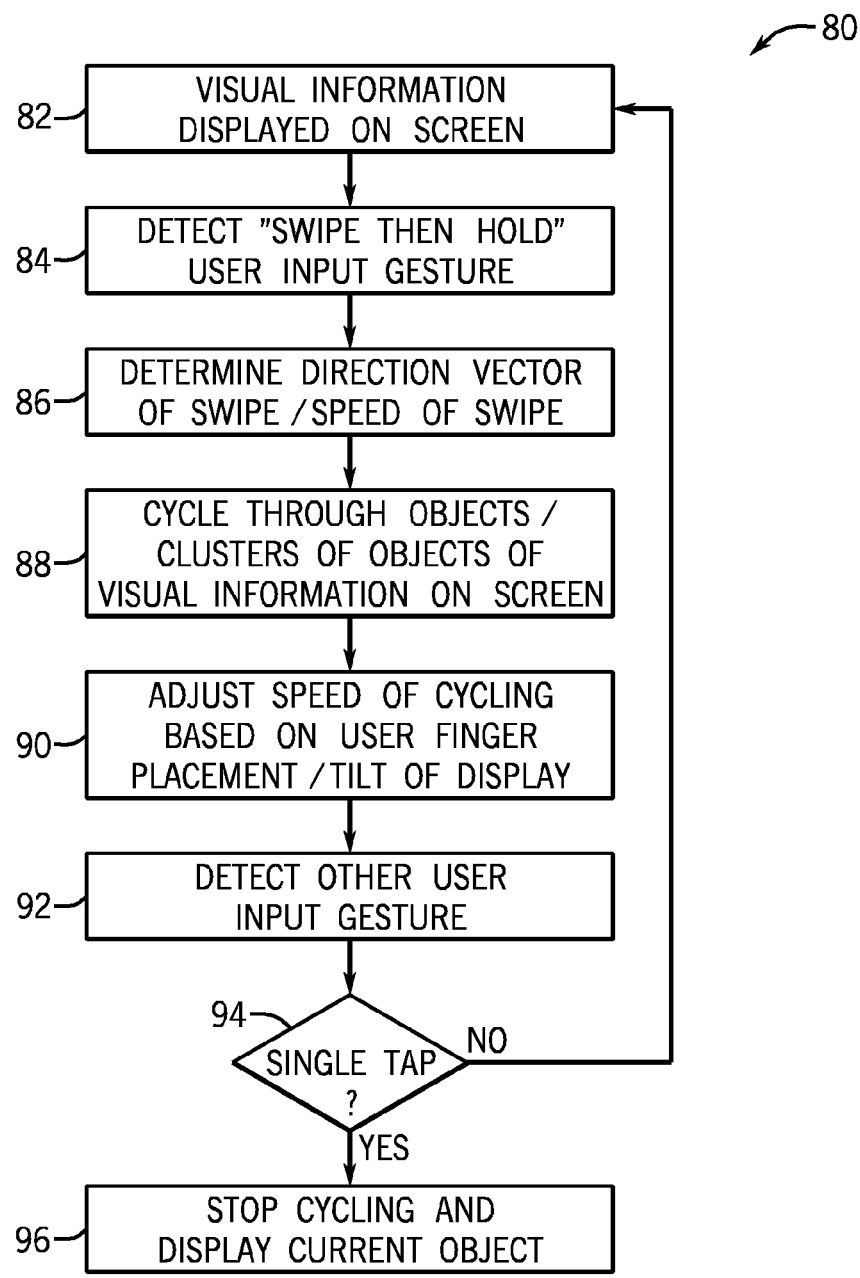
FIG. 7 is a flowchart describing an embodiment of a method for performing a technique for viewing visual information on a touch screen device.

The method represented by flowchart 80 of FIG. 7 is described visually through FIGS. 8-15. Specifically, FIG. 8 represents a "swipe then hold" touch input gesture 100, which may correspond to block 84 of the flowchart 80 of FIG. 7 and may take place while the display 18 is displaying certain visual information, such as the digital photo 50. The user may place a finger 101 onto the display 18 and swipe across in a specific direction. Following the swipe across the display 18, the finger 101 may remain in place on the display.

Figure 9:
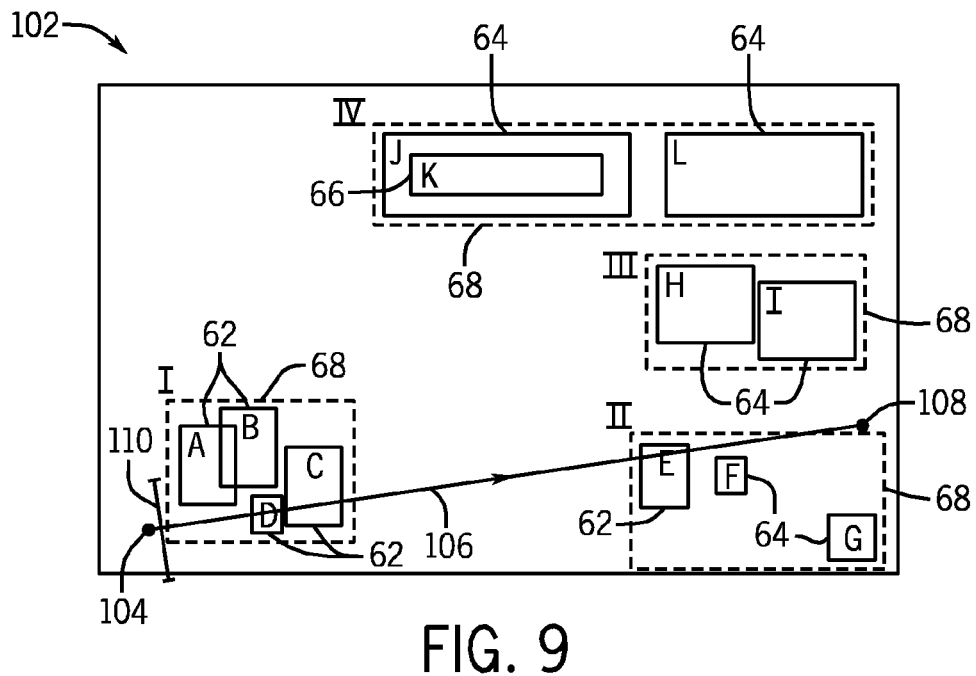
FIG. 9 is a representation of the detection of the touch input gesture of FIG. 8, in accordance with an embodiment.
Figure 10:
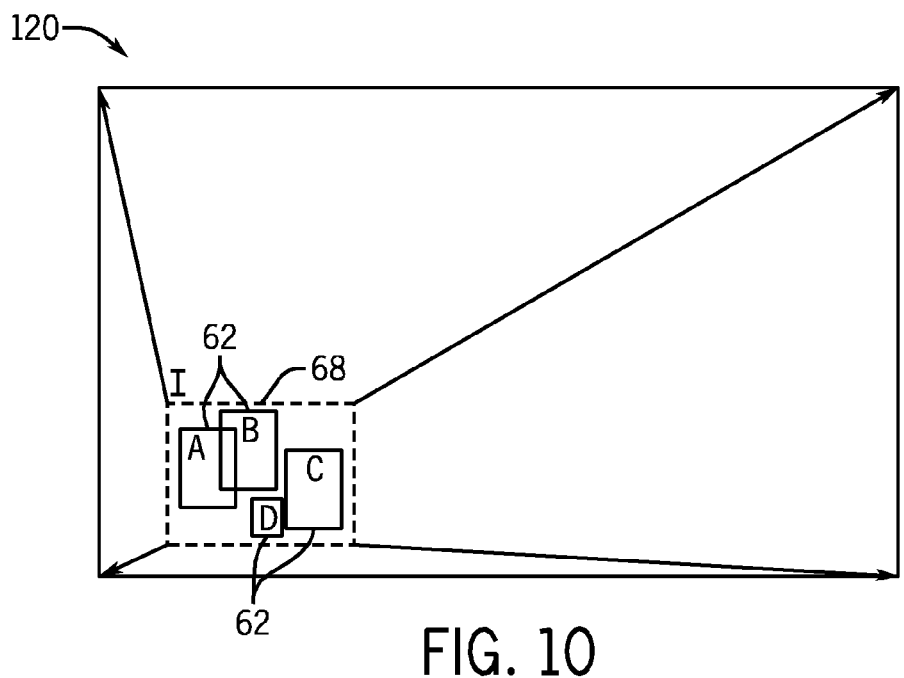
FIGS. 10-13 are representations of a manner in which various of the objects of the visual information of FIG. 4 may be displayed according to the technique of FIG. 7, in accordance with one embodiment.
Figure 11:
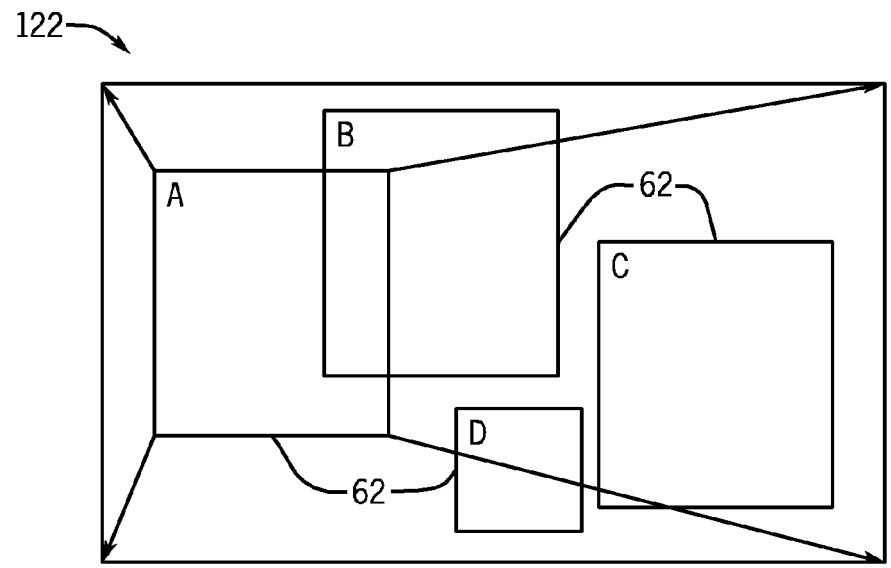
Figure 12:
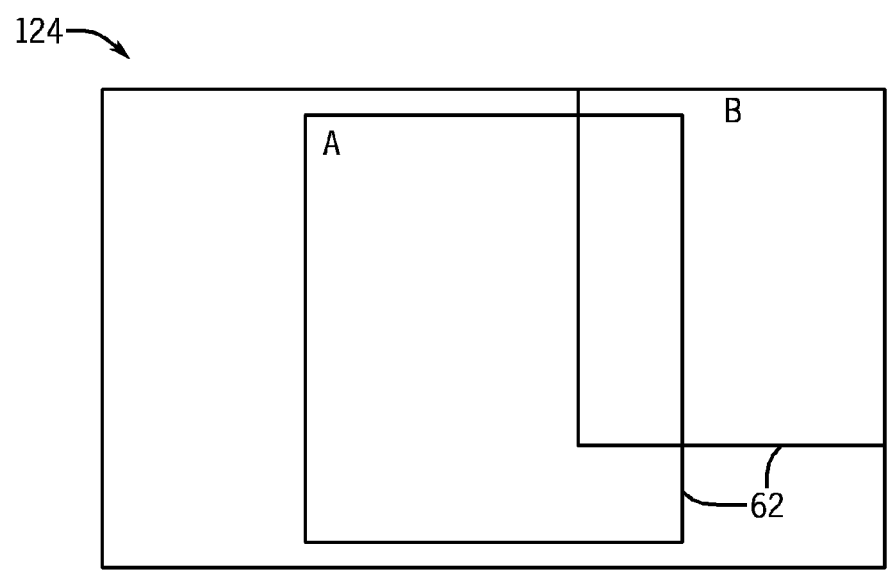
Figure 13:
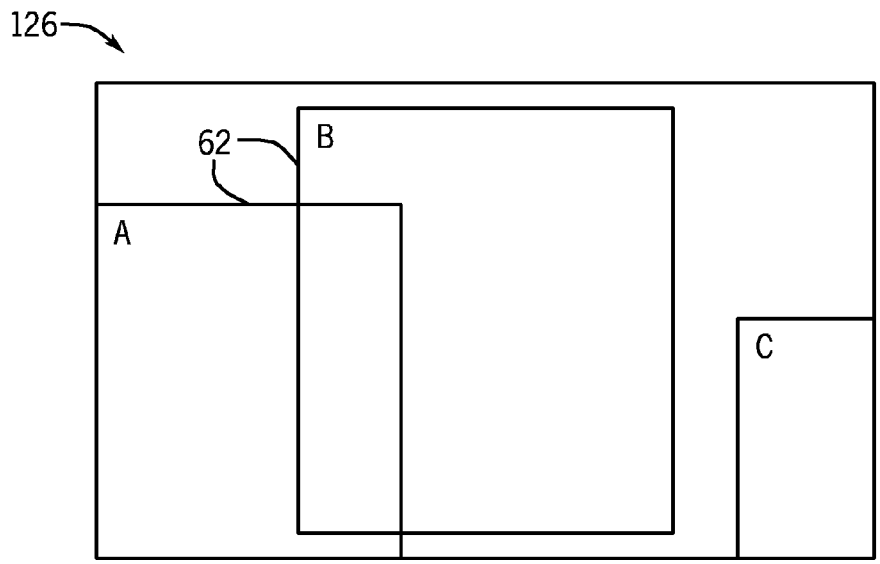
Figure 14:
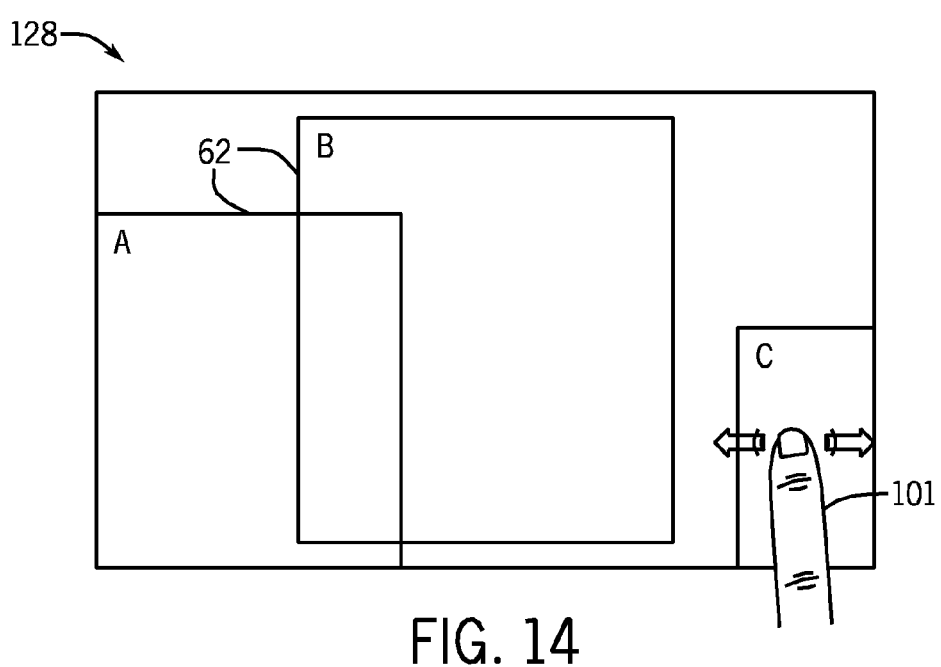
FIG. 14 is a representation of a manner in which a user may control the speed of displaying the objects, in accordance with an embodiment.

FIG. 9 illustrates a detected touch input gesture 102 representing the interpretation of the touch input gesture 100 by the electronic device 10. As shown in FIG. 9, the detected touch input gesture 102 may begin at a starting point 104, may continue along a directional path 106, and may end at a terminating point 108. The starting point 104 may represent a location on the display 18 at which a user began the "swipe" portion of the touch input gesture. The directional path 106 may represent an instantaneous or average direction of the "swipe" carried out by the user during the touch input gesture 100. The terminating point 108 may represent a point at which the user performs the "hold" portion of the touch input gesture. That is, the user may be understood to be holding the finger 101 onto the display 18 at the terminating point 108. The speed of the "swipe" may be determined based on the time taken for the "swipe" to move from the starting point 104 and the terminating point 108 and the distance between the starting point 104 and the terminating point 108.

As shown in FIG. 9, the directional path 106 may directly intersect certain of the objects 60 or clusters 68. Additionally, in some embodiments, certain objects 60 and/or clusters 68 may be located within a certain tolerance 110 from the directional path 106. As described above with reference to block 88 of the flowchart 80 of FIG. 7, the electronic device 10 may subsequently cycle through detailed views of certain of the objects 60 based on the directional path 106. In particular, in certain embodiments, the electronic device 10 may display the certain objects 60 and/or clusters 68 in the order of intersection with the directional path 106. FIGS. 10-13 describe such an embodiment of the block 88 of the flowchart 80 of FIG. 7.

From the example of the detected touch input gesture 102 of FIG. 9, the cluster 68 of objects labeled I is intersected first by the directional path 106. Thus, as represented by a process representation 120 of FIG. 10, the electronic device 10 may pan and zoom to display the cluster 68 labeled I in greater detail. It should be understood that, in operation, the electronic device 10 would not necessarily illustrate the boundaries of the cluster 68, but would instead zoom onto the elements of the visual information shown in the digital photo 50 of FIG. 4 corresponding to the cluster 68. After pausing briefly while zoomed-in on the cluster 68 labeled I, the electronic device 10 may begin to display certain objects 60 that compose the cluster 68 labeled I in greater detail, as illustrated by a process representation 122 of FIG. 11. For example, as shown by a process representation 124 of FIG. 12, the electronic device 10 may pan and zoom onto the face object 62 labeled A before, as shown by a process representation 126 of FIG. 13, panning and zooming to the face object 62 labeled B.

The electronic device 10 may continue to display various of the objects 60 within the cluster 68 until all of the objects 60 have been displayed. Following the detailed display of each of the objects 60 contained within the cluster 68, the electronic device 10 may pan and zoom to the next object 60 or cluster 68 that is intersected by the directional path 106 or is located within the tolerance 110. In the instant example, the electronic device may next pan and zoom to the cluster 68 labeled II before panning and zooming to display the constituent objects 60 within.

While the electronic device 10 is cycling through the detailed display of the objects 60, a user may vary the speed of the process in a variety of ways, which may correspond to block 90 of the flowchart 80. For example, as shown by a speed-varying process 128 of FIG. 14, the finger 101 may remain in a "hold" position on the display 18. By moving the finger 101 leftward or rightward (or, alternatively, upward or downward, or any other suitable direction), the user may cause the electronic device 10 to vary the speed and/or direction of panning and zooming. In the instant example of FIG. 14, moving the finger 101 to the right may cause the electronic device 10 to pan and zoom more quickly to the objects 60 and/or clusters 68 located along or near the directional path 106 in a forward direction. Moving the finger 101 to the left may cause the electronic device 10 to pan and zoom more slowly. Additionally or alternatively, moving the finger 101 to the left may cause the electronic device 10 to pan and zoom to objects 60 and/or clusters 68 located along or near the directional path 106 in a backward direction.

Figure 15:
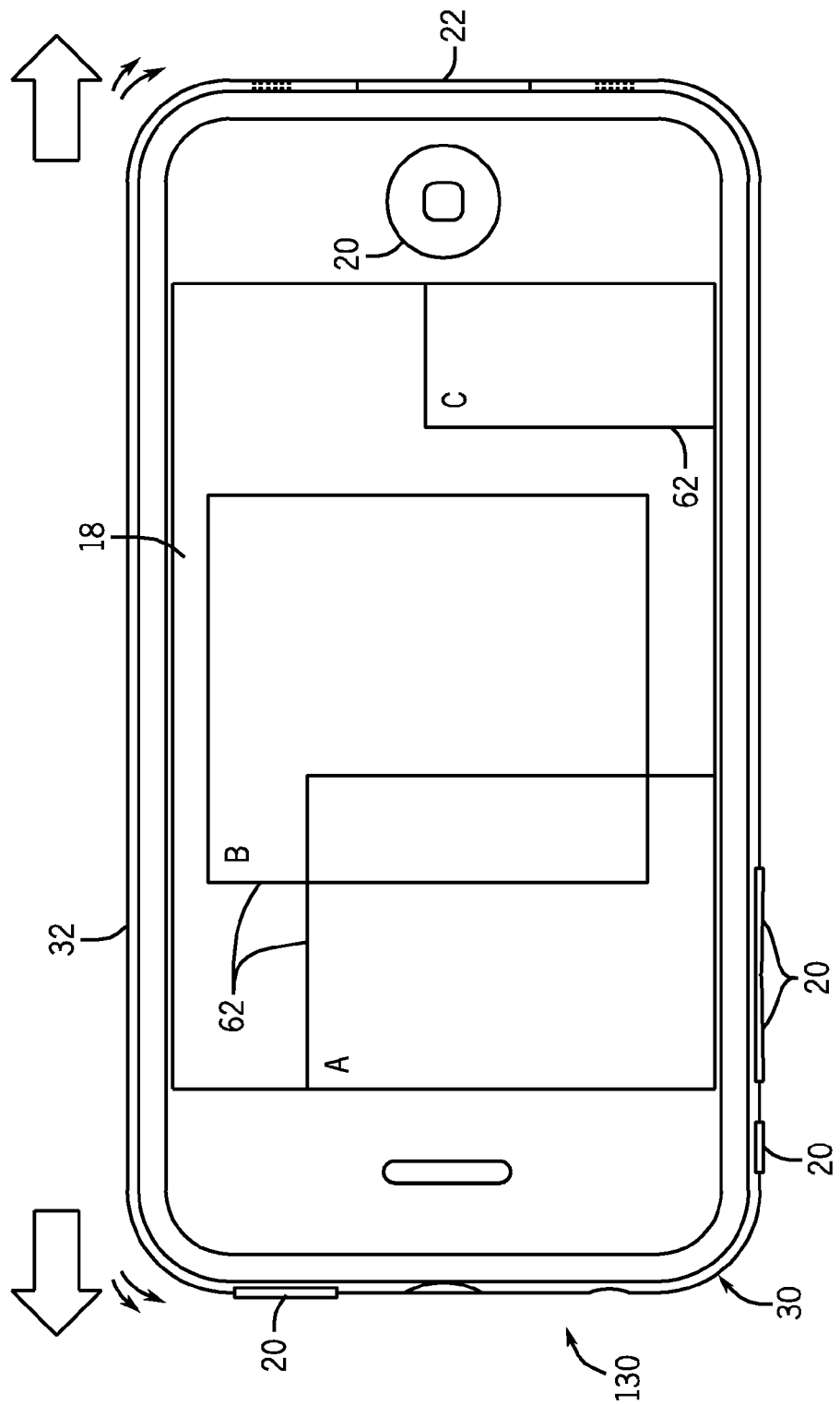
FIG. 15 is a representation of another manner in which a user may control the speed of displaying the objects, in accordance with an embodiment.

An additional or alternative speed-varying process 130 shown in FIG. 15 represents another manner of varying the speed that the electronic device 10 pans and zooms through the various objects 60 and clusters 68. As illustrated in FIG. 15, when the electronic device 10 is tilted forward or backward (or up or down, or any other suitable orientations) the electronic device 10 to pan and zoom in a faster, slower, forward, and/or reverse manner. The electronic device 10 may detect such changes in orientation via the accelerometers 28.

Regarding the embodiment described above with reference to FIGS. 7-15, the user may maintain a finger on the display 18 after performing the "swipe then hold" touch input gesture 100. However, if the display 18 is smaller (e.g., less than a few square inches), doing so may inhibit the user from viewing a substantial portion of the display 18. Especially for electronic devices 10 that include such smaller-sized displays 18, a flowchart 140 shown in FIG. 16 involves a variation of the touch input gesture of the flowchart 80 of FIG. 7. The flowchart 140 of FIG. 16 may begin when the electronic device 10 is displaying certain visual information on the display 18 (block 142). By way of example, the visual information may include an image such as a photo, a map, a video, and/or a document, and so forth. When the electronic device 10 detects a particular touch input gesture, such as a "hold then swipe" touch input gesture (block 144), the electronic device 10 may begin to display the various objects of the visual information displayed on the display 18 in greater detail in an automatic modality. In general, the touch input gesture to be detected in block 144 may involve a directional swipe and may terminate with a user's finger not remaining on the display 18. That is, upon the completion of the touch input gesture, the display 18 may be fully visible.

Having detected the "hold then swipe" gesture, the electronic device 10 may next determine a direction vector and/or a directional path of the swipe and/or a speed of the swipe (block 146). The direction vector and/or the directional path and the speed of the swipe may control certain aspects of the automatic display of the objects 60 of the visual information displayed on the display 18. Thereafter, the electronic device 10 may cause various objects 60 of the visual information displayed on the display 18 to be viewed in greater detail (block 148). As discussed in greater detail below, in certain embodiments, the electronic device 10 may pan and zoom to certain clusters 68 of objects 60 before panning and zooming to the constituent objects 60 of the cluster 68. Additionally, the electronic device 10 may pan and zoom to certain objects 60 and/or clusters 68 that are intersected by the direction vector and/or the directional path determined in block 146. Further, in some embodiments, the initial speed at which such panning and zooming occurs may depend upon the speed determined in block 146. Since the touch input gesture of step 144 does not result in the user maintaining a finger in place on the display 18, the electronic device 10 either may not vary the speed at which the objects 60 are displayed in greater detail on the display 18, or may vary the speed based on changes in the orientation of the electronic device 10 (block 150).

After the user has viewed the various objects 60 in detail, the user may desire to perform other tasks on the electronic device 10. Thus, the electronic device 10 may refrain from cycling through the display of the objects 60 when the electronic device 10 detects another touch input gesture (block 152). If the touch input gesture represents a gesture other than a "single tap" touch input gesture, for example (decision block 154), the electronic device 10 may return to a comprehensive (e.g., zoomed-out) view of the visual information displayed on the screen at the time the flowchart 80 began (block 142). If the touch input gesture represents a "single tap" touch input gesture, the electronic device 10 may pause and display only the currently selected objects 60 (block 156).

Figure 16:
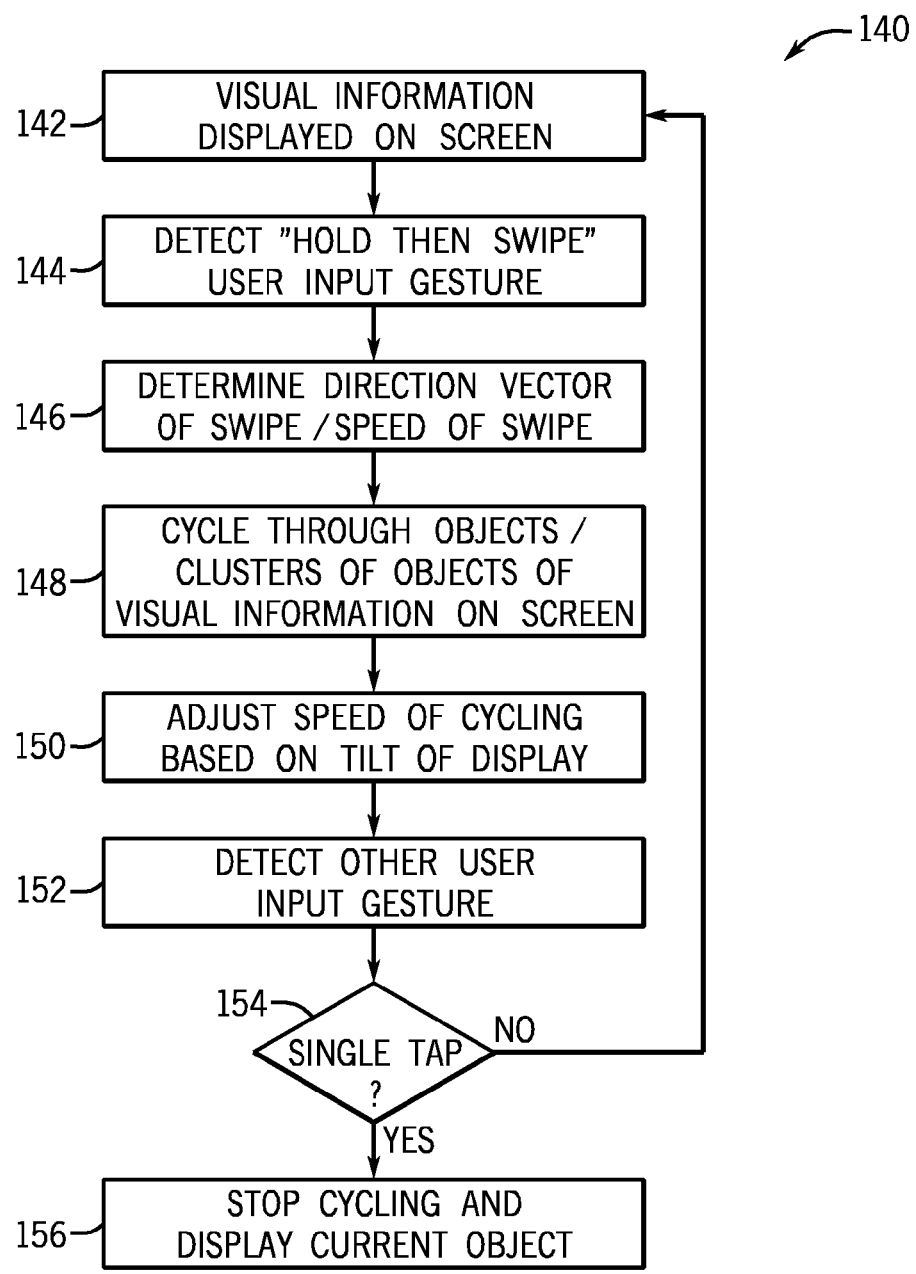
FIG. 16 is a flowchart describing an embodiment of another method for performing a technique for viewing visual information on a touch screen device.
Figure 17:
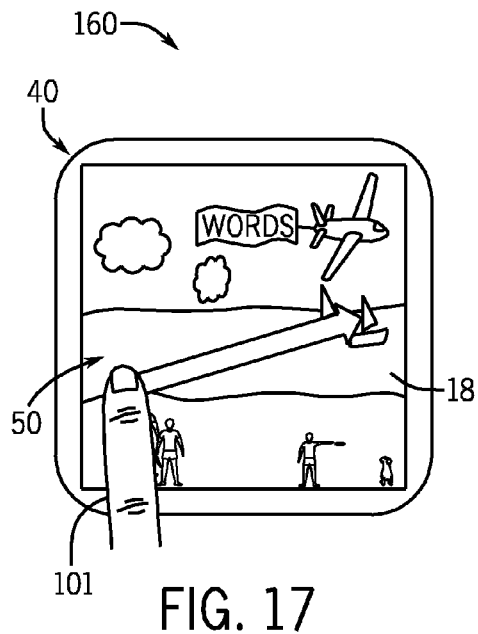
FIG. 17 is a representation of a gesture that may initiate the technique of FIG. 16, in accordance with an embodiment.
Figure 18:
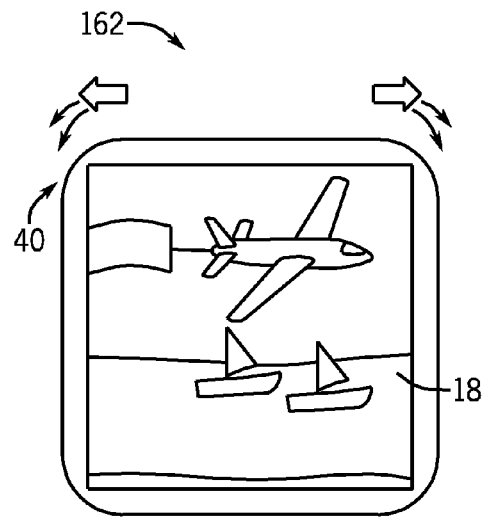
FIG. 18 is a representation of a manner of varying the speed of the display of objects of the visual information according to the technique of FIG. 16, in accordance with an embodiment.

The distinctions between the flowchart 140 of FIG. 16 and the flowchart 80 of FIG. 7 are depicted in FIGS. 17 and 18. FIG. 17 represents a manner of performing a touch input gesture 160 on the display 18 of the compact media player 40, as detected at block 146. As illustrated, the touch input gesture 160 is a "hold then swipe" touch input gesture, which may terminate when the user lifts the finger 101 off of the display 18 following the touch input gesture 160. FIG. 18 describes a process 162 for varying the speed at which the electronic device 10 cycles through the display of the various objects 60 on the display 18, as represented by block 150 of the flowchart 140 of FIG. 16. As illustrated in FIG. 18, when the electronic device 10, here shown as the compact media player 40, is tilted forward or backward (or up or down, or any other suitable orientations), the electronic device 10 to pan and zoom in a faster, slower, forward, and/or reverse manner. The electronic device 10 may detect such changes in orientation via the accelerometers 28.

Figure 19:
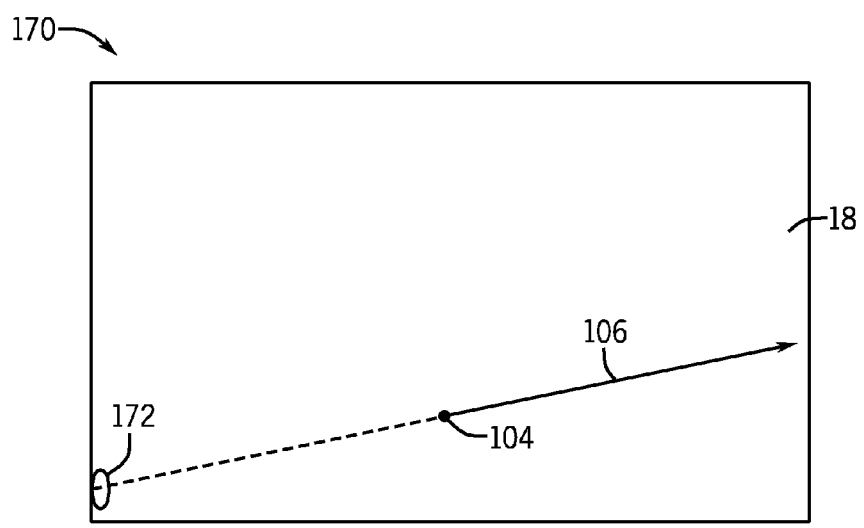
FIG. 19 is an alternative representation of the detection of the touch input gesture of FIG. 8 or 17, in accordance with an embodiment.
Figure 20:
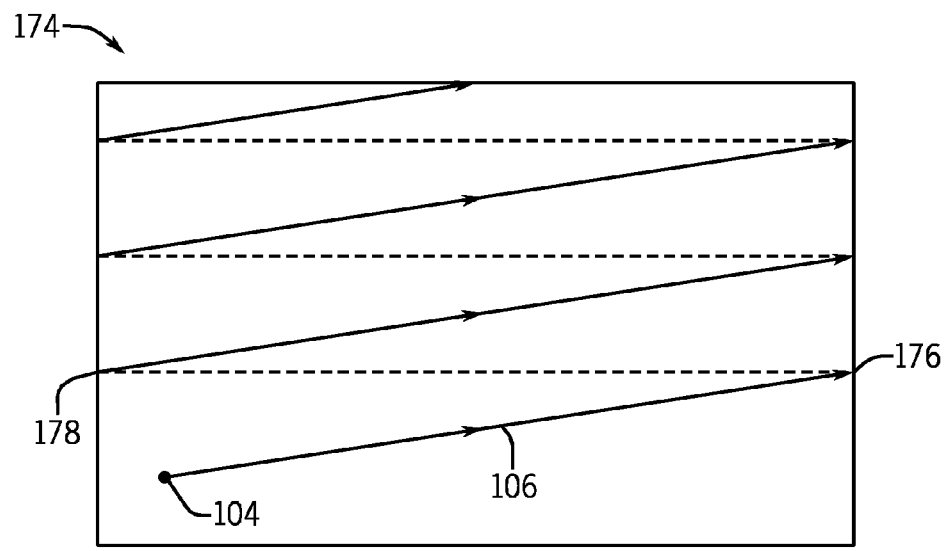
FIGS. 20-23 are representations of variations in which the visual information may be displayed on the touch screen display during the techniques of FIGS. 7 and 16, in accordance with an embodiment.

The embodiments described above may be performed in a variety of manners. For example, as illustrated by a process representation 170 of FIG. 19, the electronic device 10 may determine an alternative starting point 172 of the detected touch input gesture 102. The alternative starting point 172 may be determined based on the touch input gesture starting point 104 and the directional path 106 of the "swipe" portion of the touch input gesture 102. In particular, the electronic device 10 may determine the alternative starting point 172 at an edge of the display 18 at a point where the directional path 106 would trace to in a reverse direction. Thereafter, the electronic device 10 may determine which objects 60 and/or clusters 68 to pan and zoom to based on the alternative starting point 72.

In various embodiments, the electronic device 10 may calculate a variety of manners in which the directional path 106 may be treated upon reaching an edge of the visual information, several of which are represented by FIGS. 20-23. In a first process 174 of FIG. 20, the electronic device 10 may determine the directional path 106 to "wrap around" the visual information upon reaching the edge. Upon an edge point 176, the directional path 106 may continue immediately at a new starting point 178. The process 174 may continue until reaching an upper edge 179 of the visual information, or the process 174 may return to the starting point 104 and begin again.

Figure 21:
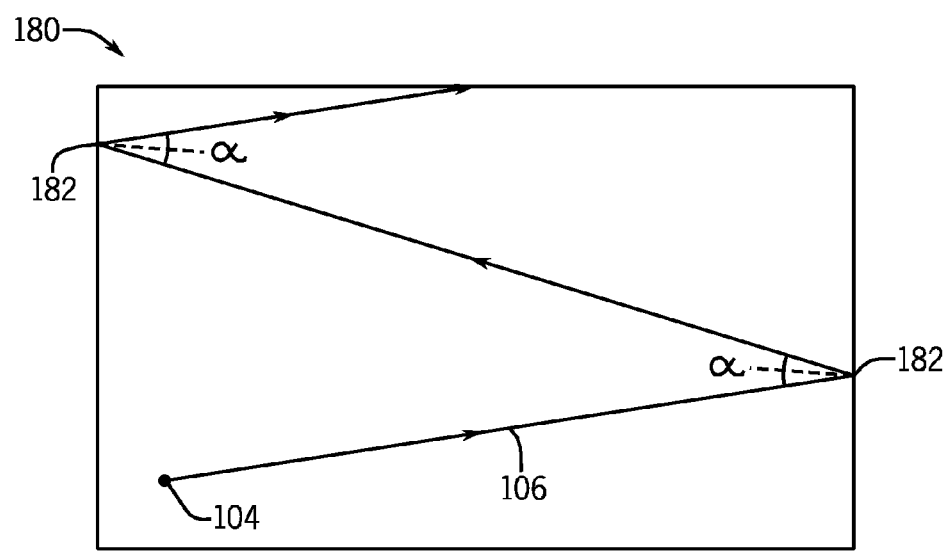
Figure 22:
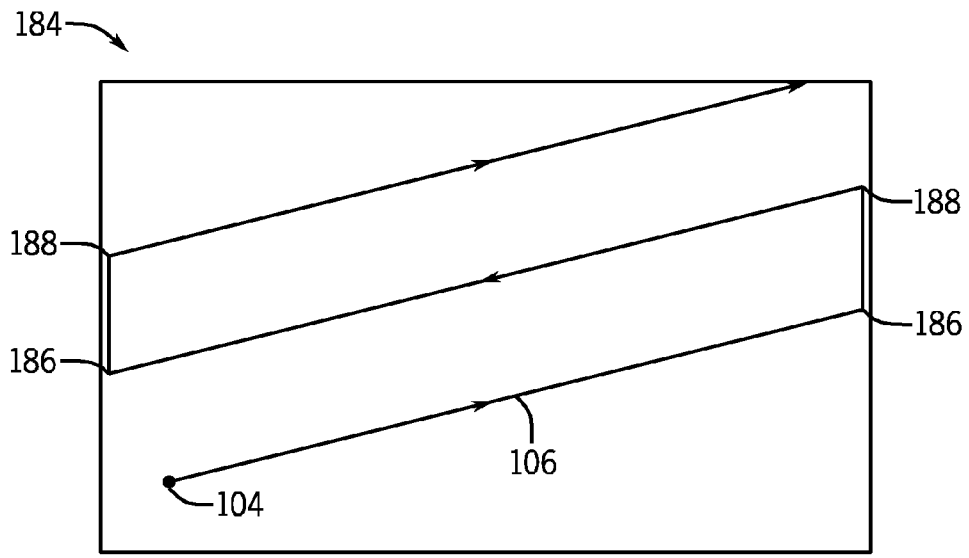
Figure 23:
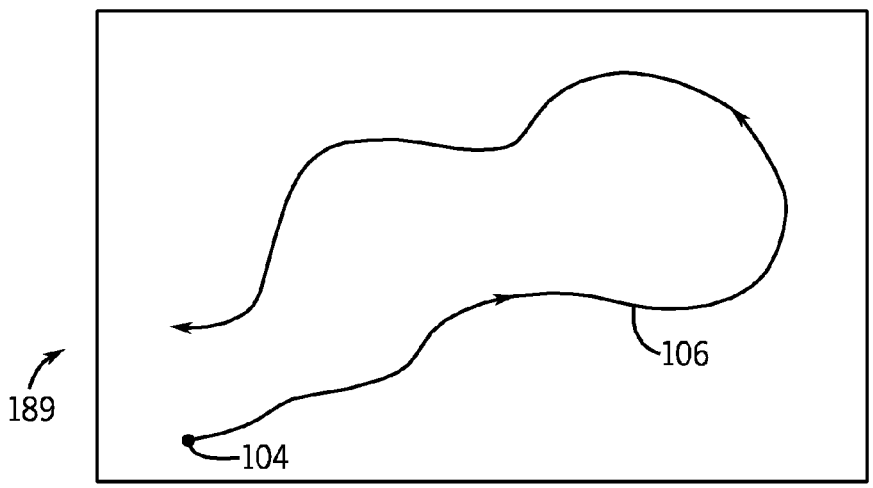

For some embodiments, such as a process 180 of FIG. 21, the directional path 106 may be calculated to "reflect" at an edge point 182 of the visual information at some angle α. In another embodiment, as illustrated by a process 184 of FIG. 22, the directional path 106 may be determined as traveling to an edge point 186 of the visual information before traveling up to another edge point 188, following a pattern such as that illustrated in FIG. 22. In other embodiments, such as illustrated by a process 189 of FIG. 23, the directional path 106 may wind around the visual information along a pattern defined by the user's "swipe" gesture, or may be determined by the electronic device 10 in another way (e.g., a random path across the visual information). Also, in some embodiments, the directional path 106 may simply end when an edge of the visual information is reached, or may return to the starting point 104 or an alternative starting point 172.

Figure 24:
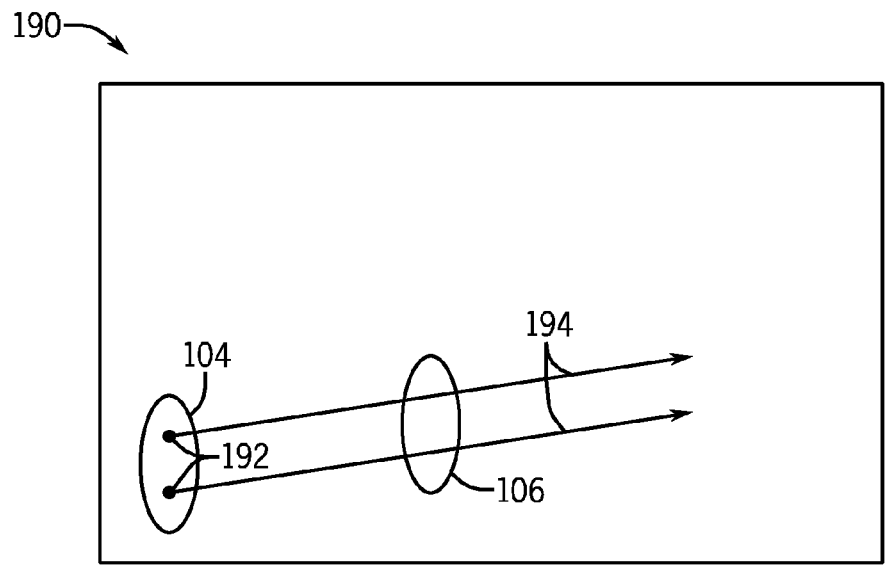
FIG. 24 describes an alternative manner of performing the gestures illustrated in FIGS. 8 and 17, in accordance with an embodiment.

In addition, various other touch input gestures may be employed, which generally may include a directional component (e.g., a "swipe"). For example, an alternative touch input gesture 190 of FIG. 24 may be a multiple simultaneous touch input gesture, such as a multiple simultaneous swipe. Dual starting points 192 of the alternative touch input gesture 190 may correspond to the starting point 104 of the detected touch input gesture 102, and dual direction vectors 194 of the alternative touch input gesture 190 may correspond to the directional path 106 of the detected touch input gesture 102.

Figure 25:
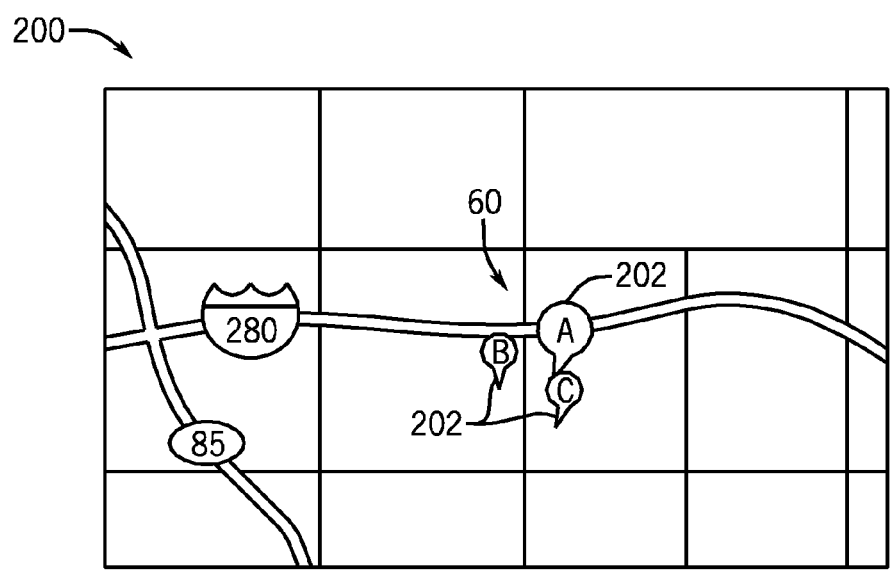
FIG. 25 is a representation of a map having various objects appearing therein, in accordance with an embodiment.

The present disclosure may also apply to certain visual information, the details of which may not be presently stored in the memory 14 or nonvolatile storage 16 of the electronic device 10. Among other things, such visual information may include an online map whose details may be remotely located, such as a map 200 of FIG. 25. As illustrated in FIG. 25, the map 200 includes a variety of downloadable objects 202, here representing identified places on the map 200 (e.g., as a result of a search).

Figure 26:
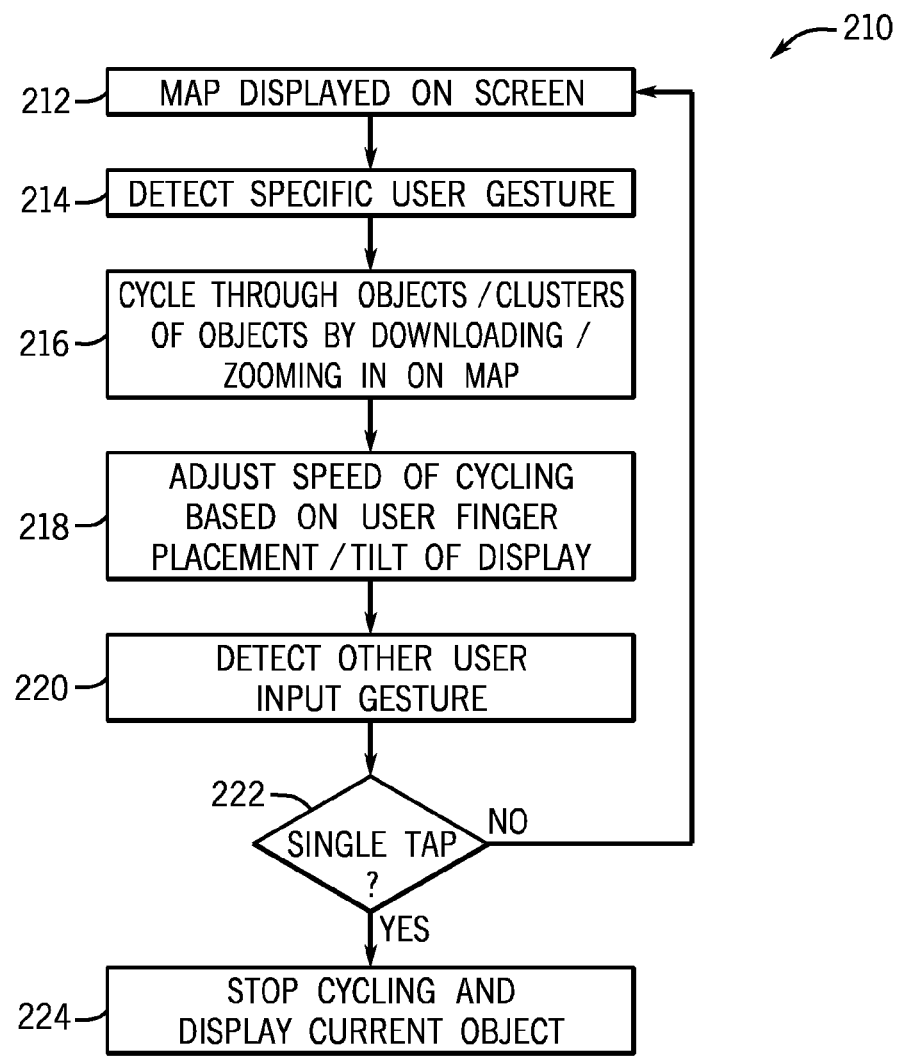
FIG. 26 is a flowchart describing an embodiment of a method for displaying in greater detail the objects of a map, such as the map of FIG. 25.

A flowchart 210 of FIG. 26 presents an embodiment of a method to allow a user to more clearly view the map objects 202 in greater detail by performing a specific touch input gesture. In particular, the flowchart 210 may begin when visual information having details not previously stored on the memory 14 of the electronic device 10, such as the map 200, is displayed on the display 18 (block 212). The electronic device 10 may detect a specific touch input gesture, such as a "hold then swipe" or "swipe then hold" gesture (block 214).

The electronic device 10 next may begin to cycle through the various downloadable objects 202 (block 216). The order by which to cycle through the downloadable objects 202 may be determined based on the touch input gesture detected in block 214 (e.g., downloadable objects 202 intersected by a directional path 106) or based on other criteria (e.g., search relevance). In carrying out the processes of block 216, the electronic device 10 may download a more detailed view of some or all of the downloadable objects 202 before panning and zooming to the downloadable objects 202, as discussed further below.

The speed at which the electronic device 10 cycles through the downloadable objects 202 may vary depending on user input (e.g., the initial speed of the touch input gesture, moving a finger forward or backward on the display 18, or tilting the electronic device 10) and whether the next downloadable object 202 to be cycled to has been downloaded (block 218). When the user has viewed some or all of the downloadable objects 202 in detail, the user may desire to perform other tasks on the electronic device 10. Thus, the electronic device 10 may refrain from cycling through the display of the downloadable objects 202 when the electronic device 10 detects another touch input gesture (block 220). If the touch input gesture represents a gesture other than a "single tap" touch input gesture, for example (decision block 222), the electronic device 10 may return to a comprehensive (e.g., zoomed-out) view of the visual information displayed on the screen at the time the flowchart 80 began (block 212). If the touch input gesture represents a "single tap" touch input gesture, the electronic device 10 may pause and display only the currently selected map objects 202 (block 224).

Figure 27:
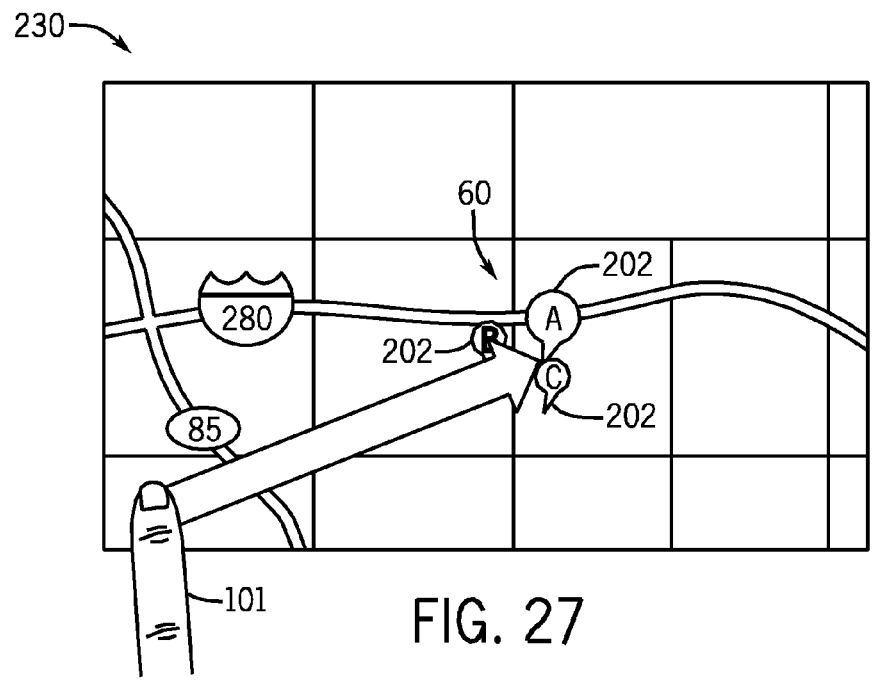
FIGS. 27 and 28 are representations of manners for carrying out the method of FIG. 26, in accordance with an embodiment.
Figure 28:
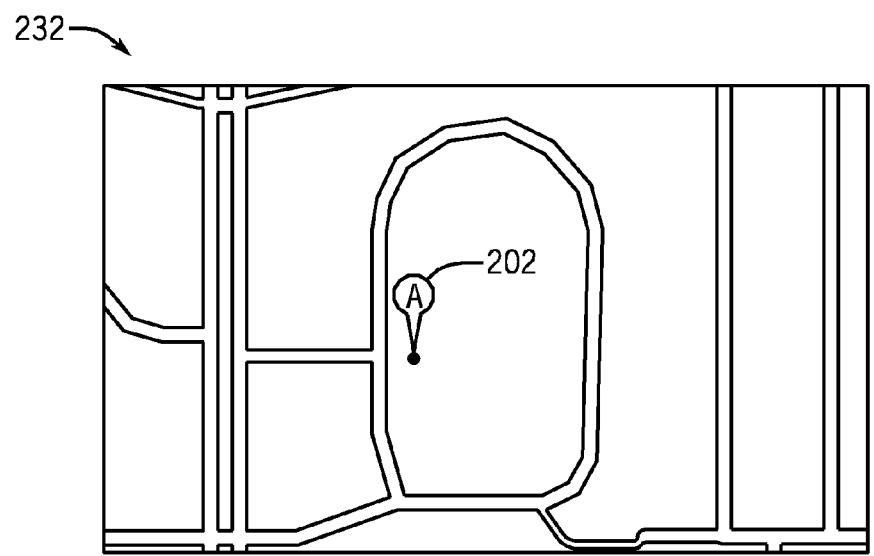

As illustrated by FIGS. 27 and 28, the method discussed above with reference to FIG. 26 may take place in a very similar manner to the previously-described embodiments. When the display detects the user's finger 101 across the map 200, as shown by a process 230 of FIG. 27, the electronic device 10 may begin to download additional details regarding the map objects 202 that are intersected by the touch input gesture. For example, as shown by a screen 232 of FIG. 28, after certain details have been downloaded, the electronic device 10 next may display the first map object 202 in greater detail.

Figure 29:
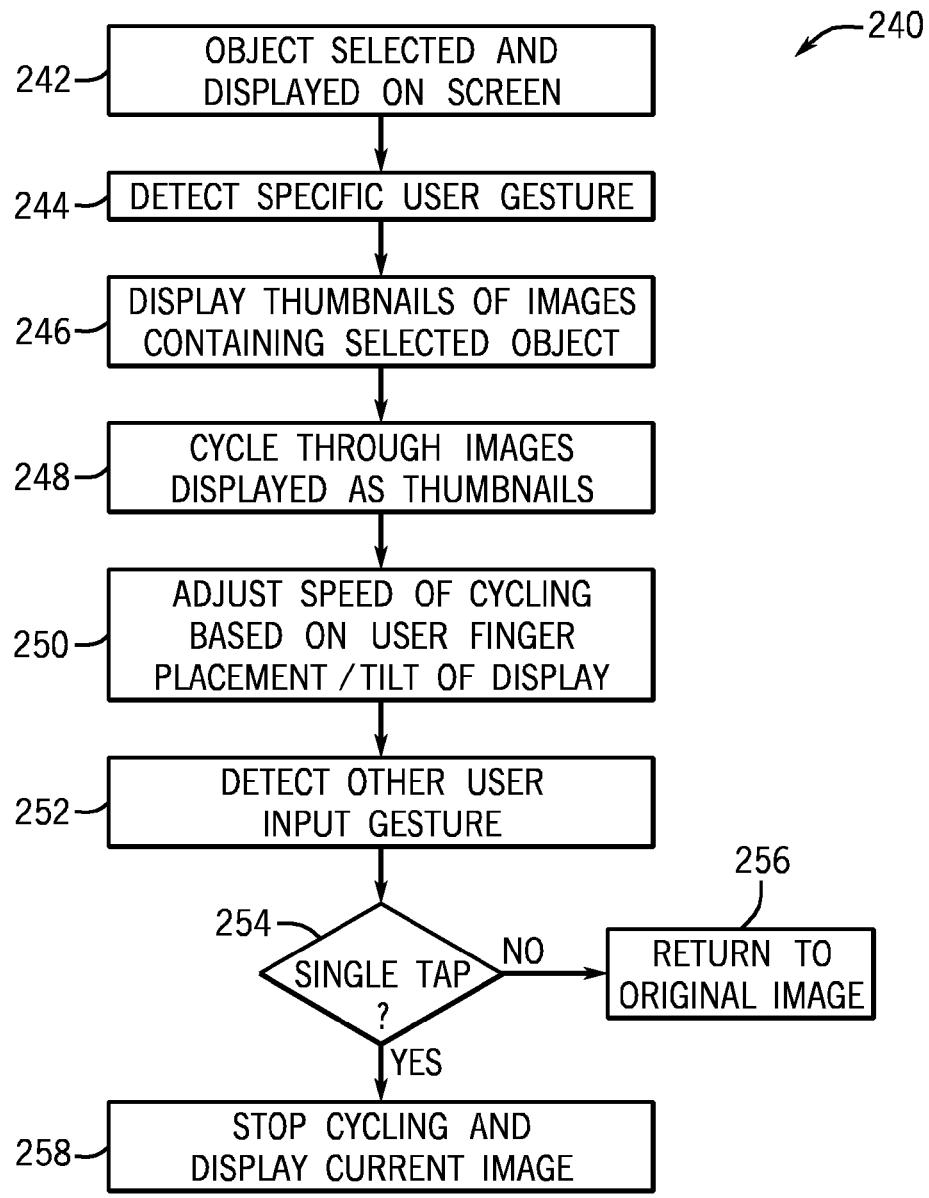
FIG. 29 is a flowchart describing an embodiment of a method for viewing a series of images that each include a certain object.
Figure 30:
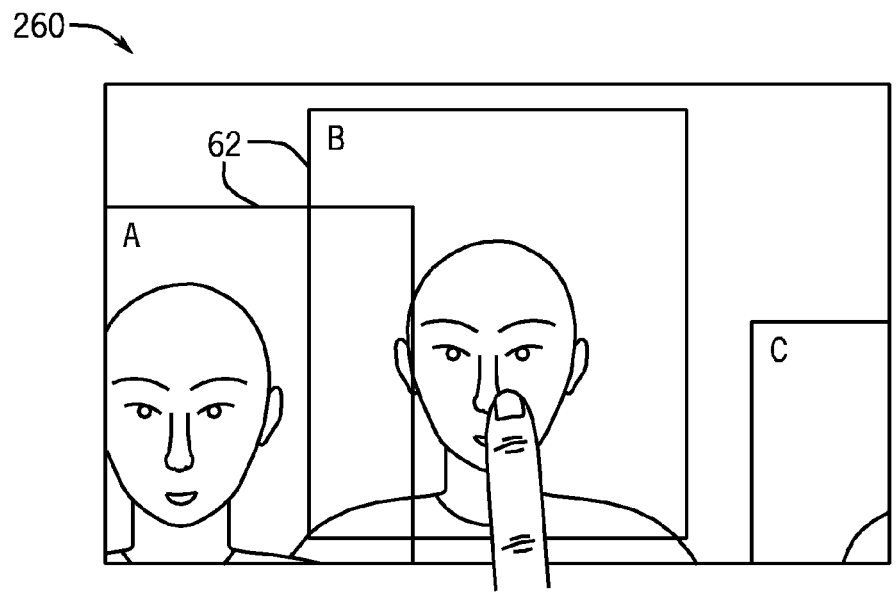
FIGS. 30-35 are representations of a manner of carrying out the method of FIG. 29.

After a user has viewed a given object 60, including map objects 202, in greater detail, a user may desire to see other visual information, such as images, videos, documents, and so forth, that contain the same object 60 of interest. The electronic device 10 thus may enable an automatic and simplified display of other such images and/or videos that contain the object 60, as provided by a flowchart 240, shown in FIG. 29. The flowchart 240 may begin when an object 60 has been selected by the user and may be currently displayed on the display 18 of the electronic device 10 (block 242).

A user may next undertake a specific touch input gesture, such as those described above or any other suitable touch input gesture (block 244). The specific touch input gesture may indicate that the user desires to see additional visual information containing the object 60 that is currently selected. The electronic device 10 then may display various thumbnails of images and/or videos that contain the selected object 60 (block 246), before cycling through the various images in greater detail (block 248). Like the techniques described above with reference to FIGS. 7 and 16, the speed of the cycling through the thumbnails may depend upon user finger placement on the display 18, as discussed above with reference to block 90 of FIG. 7, or may rely on an orientation of the display 18 as determined by the accelerometers 28.

The user may choose to halt the cycling of images by inputting another touch input gesture, which may be detected by the electronic device 10 (block 252). If the touch input gesture represents a certain touch input gesture (e.g., a "single tap" gesture) (decision block 254), the electronic device 10 may return to displaying the original image on the display 18 (block 256). Otherwise, the electronic device 10 may end the cycling and may display the current image the electronic display has cycled to (block 258).

FIGS. 30-35 provide a visual explanation of certain elements of the method of the flowchart 240. A screen 260 continues with the example ending on FIG. 13, at which point the electronic device 10 has cycled between various objects 60 of the digital photo 50 or, more particularly, between certain face objects 62 of the image 50. The user may select a certain face object 62 with a single tap gesture, as discussed above with reference to FIGS. 7 and 16. This may cause the electronic device 10 to stop cycling through the objects 60 of the digital photo 50. Instead, the electronic device 10 may remain fixed on the currently selected object 60, here the face object 62 labeled B, which represents the face of a particular person in the digital photo 50.

Figure 31:
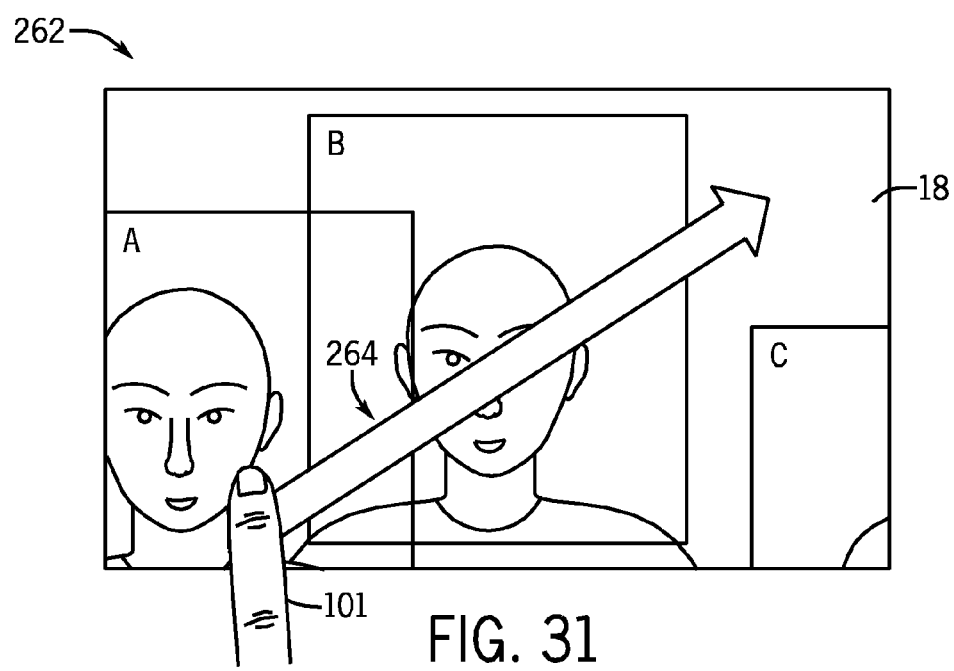
Figure 32:
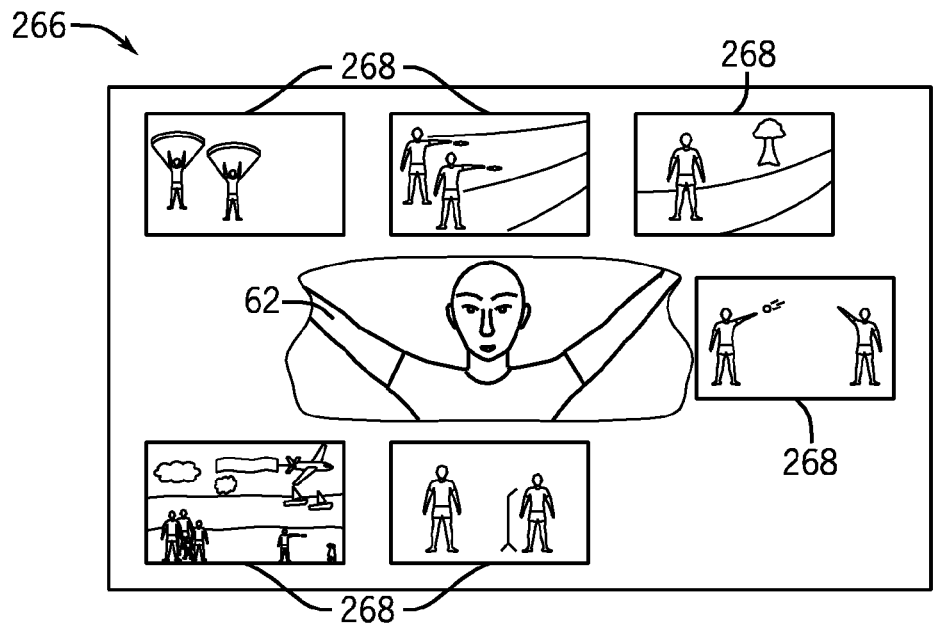
Figure 33:
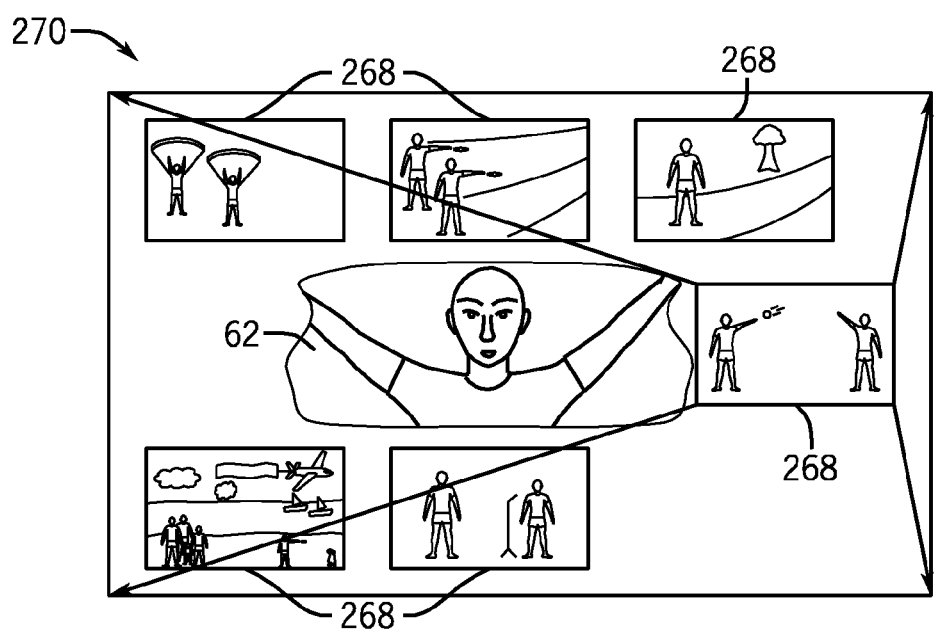
Figure 34:
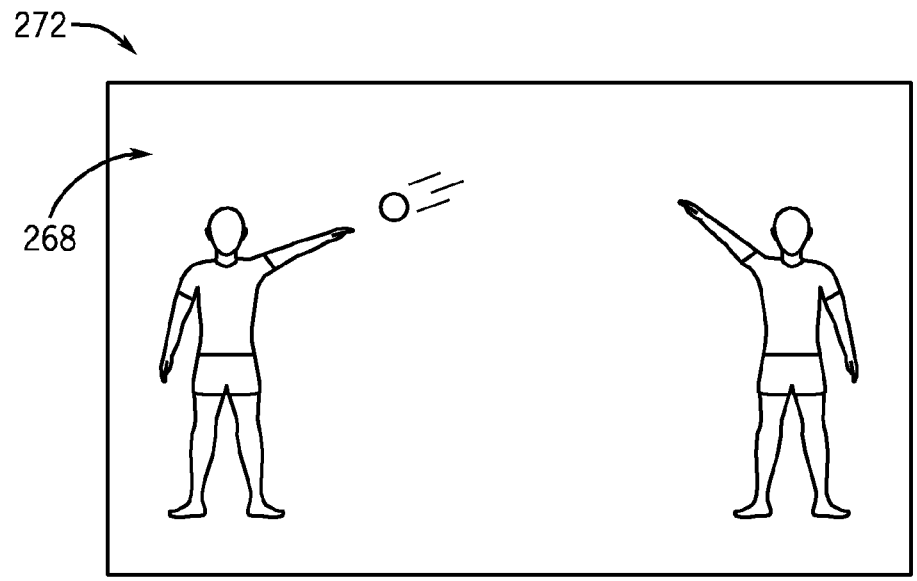
Figure 35:
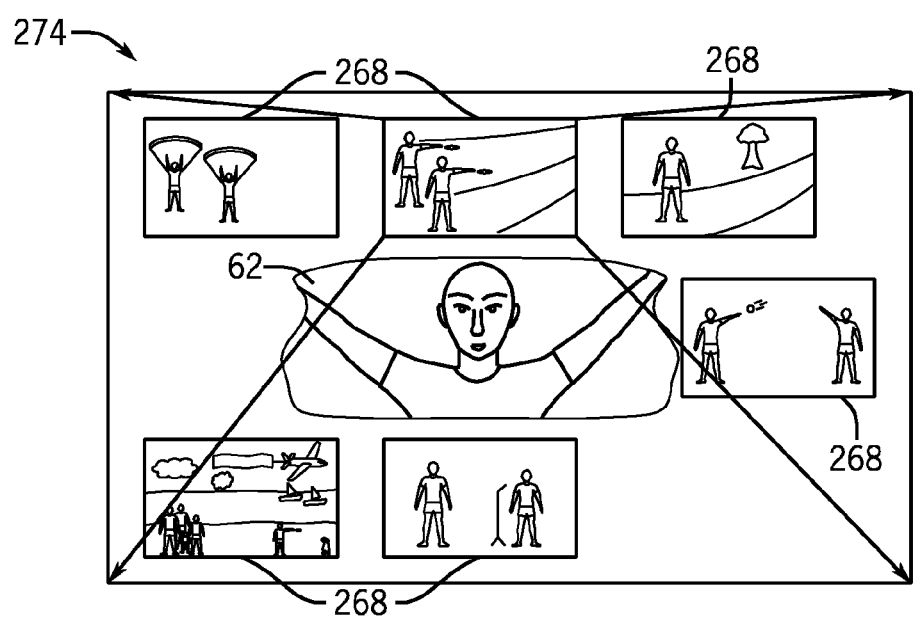

As represented a screen 262 of FIG. 31, when the user performs a specific touch input gesture 264, such as a "swipe then hold" touch input gesture, across the display 18, the electronic device 10 may zoom out from the object 62 and display a series of thumbnail images that also contain the same object 60, as represented by a screen 266 of FIG. 32. As apparent from the screen 266 of FIG. 32, a given object 60, such as the face object 62 labeled B, may be present in a variety of other images 268, videos, documents, and so forth stored on the electronic device 10 or at a remotely accessible location, such as a social-networking website. The electronic device 10 may then begin to cycle through the various images 268 that contain the selected object 60 in greater detail, as represented by a screen 270 of FIG. 33. Thereafter, for example, the electronic device 10 may display the images 268 in greater detail, as also illustrated by a screen 272 of FIG. 34. In some embodiments, the electronic device 10 may then pan and zoom onto other objects 60 appearing in the currently displayed image 268 in greater detail. The electronic device 10 may subsequently pan and zoom away from the selected image 268, as shown by a screen 274 of FIG. 35, before panning and zooming onto another image 268 that contains the selected object 60. This process may repeat until the user provides a further touch input gesture to stop the electronic device from continuing to cycle through the images 268.

The specific embodiments described above have been shown by way of example, and it should be understood that these embodiments may be susceptible to various modifications and alternative forms. It should be further understood that the claims are not intended to be limited to the particular forms disclosed, but rather to cover all modifications, equivalents, and alternatives falling within the spirit and scope of this disclosure.

What is claimed is:

1. A method comprising:
   at an electronic device that includes a display and a touch-sensitive surface:
   displaying a user interface that includes a plurality of identified objects;
   while the user interface is displayed on the display, detecting a gesture that includes movement of a contact across the touch-sensitive surface that corresponds to a path in the user interface;
   identifying a first object and a second object in the plurality of identified objects that are within a predefined distance of the path; and
   after the contact has moved away from a location on the touch-sensitive surface that corresponds to a location of the first object and a location of the second object on the display, sequentially displaying enlarged representations of objects in the plurality of identified objects that includes an enlarged representation of the first object and an enlarged representation of the second object.

2. The method of claim 1, wherein:
   the user interface includes an image; and the first object and the second object correspond to predetermined points of interest in the image.

3. The method of claim 1, wherein:
the user interface includes an image of a plurality of people; and
the first object and the second object correspond to faces in the image.

4. The method of claim 1, wherein the gesture that includes movement of the contact across the touch-sensitive surface is a single contact gesture.

5. The method of claim 1, wherein:
the path has a respective direction that corresponds to a direction of movement of the contact across the touch-sensitive surface; and
the sequentially displayed enlarged representations of objects are displayed in an order that corresponds to the respective direction of the path.

6. The method of claim 1, wherein the first object and the second object are intersected by the path.

7. The method of claim 1, wherein the sequentially displayed enlarged representations of objects are displayed without displaying enlarged representations of one or more of the identified objects in the user interface that are not within the predefined distance of the path.

8. The method of claim 1, wherein sequentially displaying the enlarged representations of objects includes panning and zooming the user interface.

9. The method of claim 1, wherein sequentially displaying the enlarged representations of objects includes:
ceasing to display the second object while displaying the enlarged representation of the first object; and
ceasing to display the first object while displaying the enlarged representation of the second object.

10. The method of claim 1, wherein:
sequentially displaying the enlarged representations of objects includes automatically cycling through a sequence of enlarged representations of objects; and
the method includes:
while cycling through the sequence of enlarged representations of objects, detecting a predefined gesture on the touch-sensitive surface; and
in response to detecting the predefined gesture on the touch-sensitive surface, ceasing to cycle through the sequence of enlarged representations of objects.

11. The method of claim 1, wherein:
the first object is in a first cluster of objects that includes the first object and one or more other objects in the plurality of objects;
the second object is in a second cluster of objects, different from the first cluster of objects, that includes the second object and one or more other objects in the plurality of objects; and
sequentially displaying the enlarged representations of objects includes, in order:
displaying an enlarged representation of the first cluster of objects;
displaying an enlarged representation of the first object;
displaying an enlarged representation of the second cluster of objects; and
displaying an enlarged representation of the second object.

12. The method of claim 1, including detecting liftoff of the contact from the touch-sensitive surface, wherein the sequentially displaying enlarged representations of objects occurs after detecting liftoff of the contact from the touch-sensitive surface.

13. The method of claim 1, including detecting an end of movement of the contact across the touch-sensitive surface, wherein the sequentially displaying enlarged representations of objects occurs after detecting an end of the movement of the contact across the touch-sensitive surface.

14. An electronic device, comprising:
a display;
a touch-sensitive surface;
one or more processors;
memory; and
one or more programs, wherein the one or more programs are stored in the memory and configured to be executed by the one or more processors, the one or more programs including instructions for:
displaying a user interface that includes a plurality of identified objects;
while the user interface is displayed on the display, detecting a gesture that includes movement of a contact across the touch-sensitive surface that corresponds to a path in the user interface;
identifying a first object and a second object in the plurality of identified objects that are within a predefined distance of the path; and
after the contact has moved away from a location on the touch-sensitive surface that corresponds to a location of the first object and a location of the second object on the display, sequentially displaying enlarged representations of objects in the plurality of identified objects that includes an enlarged representation of the first object and an enlarged representation of the second object.

15. The device of claim 14, wherein the sequentially displayed enlarged representations of objects are displayed without displaying enlarged representations of one or more of the identified objects in the user interface that are not within the predefined distance of the path.

16. The device of claim 14, wherein sequentially displaying the enlarged representations of objects includes panning and zooming the user interface.

17. The device of claim 14, wherein sequentially displaying the enlarged representations of objects includes:
ceasing to display the second object while displaying the enlarged representation of the first object; and
ceasing to display the first object while displaying the enlarged representation of the second object.

18. The device of claim 14, wherein:
sequentially displaying the enlarged representations of objects includes automatically cycling through a sequence of enlarged representations of objects; and
the one or more programs include instructions for:
while cycling through the sequence of enlarged representations of objects, detecting a predefined gesture on the touch-sensitive surface; and
in response to detecting the predefined gesture on the touch-sensitive surface, ceasing to cycle through the sequence of enlarged representations of objects.

19. The device of claim 14, wherein:
the first object is in a first cluster of objects that includes the first object and one or more other objects in the plurality of objects;
the second object is in a second cluster of objects, different from the first cluster of objects, that includes the second object and one or more other objects in the plurality of objects; and
sequentially displaying the enlarged representations of objects includes, in order:

displaying an enlarged representation of the first cluster of objects;

displaying an enlarged representation of the first object;

displaying an enlarged representation of the second cluster of objects; and displaying an enlarged representation of the second object.

20. The device of claim 14, including instructions for detecting liftoff of the contact from the touch-sensitive surface, wherein the sequentially displaying enlarged representations of objects occurs after detecting liftoff of the contact from the touch-sensitive surface.

21. The device of claim 14, including instructions for detecting an end of movement of the contact across the touch-sensitive surface, wherein the sequentially displaying enlarged representations of objects occurs after detecting an end of the movement of the contact across the touch-sensitive surface.

22. A non-transitory computer readable storage medium storing one or more programs, the one or more programs comprising instructions, which when executed by an electronic device with a display and a touch-sensitive surface, cause the device to:

display a user interface that includes a plurality of identified objects;

while the user interface is displayed on the display, detect a gesture that includes movement of a contact across the touch-sensitive surface that corresponds to a path in the user interface;

identify a first object and a second object in the plurality of identified objects that are within a predefined distance of the path; and after the contact has moved away from a location on the touch-sensitive surface that corresponds to a location of the first object and a location of the second object on the display, sequentially display enlarged representations of objects in the plurality of identified objects that includes an enlarged representation of the first object and an enlarged representation of the second object.

23. The non-transitory computer readable storage medium of claim 22, wherein the sequentially displayed enlarged representations of objects are displayed without displaying enlarged representations of one or more of the identified objects in the user interface that are not within the predefined distance of the path.

24. The non-transitory computer readable storage medium of claim 22, wherein sequentially displaying the enlarged representations of objects includes panning and zooming the user interface.

25. The non-transitory computer readable storage medium of claim 22, wherein sequentially displaying the enlarged representations of objects includes:

ceasing to display the second object while displaying the enlarged representation of the first object; and ceasing to display the first object while displaying the enlarged representation of the second object.

26. The non-transitory computer readable storage medium of claim 22, wherein:

sequentially displaying the enlarged representations of objects includes automatically cycling through a sequence of enlarged representations of objects; and the one or more programs include instructions which, when executed, cause the device to:

while cycling through the sequence of enlarged representations of objects, detect a predefined gesture on the touch-sensitive surface; and in response to detecting the predefined gesture on the touch-sensitive surface, cease to cycle through the sequence of enlarged representations of objects.

27. The non-transitory computer readable storage medium of claim 22, wherein:

the first object is in a first cluster of objects that includes the first object and one or more other objects in the plurality of objects;

the second object is in a second cluster of objects, different from the first cluster of objects, that includes the second object and one or more other objects in the plurality of objects; and sequentially displaying the enlarged representations of objects includes, in order:

displaying an enlarged representation of the first cluster of objects;

displaying an enlarged representation of the first object;

displaying an enlarged representation of the second cluster of objects; and displaying an enlarged representation of the second object.

28. The non-transitory computer readable storage medium of claim 22, wherein the one or more programs include instructions which, when executed, cause the device to detect liftoff of the contact from the touch-sensitive surface, wherein the sequentially displaying enlarged representations of objects occurs after detecting liftoff of the contact from the touch-sensitive surface.

29. The non-transitory computer readable storage medium of claim 22, wherein the one or more programs include instructions which, when executed, cause the device to detect an end of movement of the contact across the touch-sensitive surface, wherein the sequentially displaying enlarged representations of objects occurs after detecting an end of the movement of the contact across the touch-sensitive surface.

* * * * *